(12) United States Patent
Tsuchiya

(10) Patent No.: US 12,548,892 B2
(45) Date of Patent: Feb. 10, 2026

(54) ANTENNA APPARATUS, SYSTEM, COMMUNICATION APPARATUS, DATA PROCESSING APPARATUS, AND COMPUTER READABLE STORAGE MEDIUM

(71) Applicant: SoftBank Corp., Tokyo (JP)

(72) Inventor: Takahiro Tsuchiya, Tokyo (JP)

(73) Assignee: SoftBank Corp., Tokyo (JP)

(*) Notice: Subject to any disclaimer, the term of this patent is extended or adjusted under 35 U.S.C. 154(b) by 181 days.

(21) Appl. No.: 18/480,513

(22) Filed: Oct. 4, 2023

(65) Prior Publication Data

US 2024/0030585 A1 Jan. 25, 2024

Related U.S. Application Data

(63) Continuation of application No. PCT/JP2022/011306, filed on Mar. 14, 2022.

(30) Foreign Application Priority Data

Apr. 9, 2021 (JP) .................................. 2021-066609
May 26, 2021 (JP) .................................. 2021-088762

(51) Int. Cl.
  H01Q 1/32 (2006.01)
  H01Q 21/06 (2006.01)
  H01Q 21/08 (2006.01)
  H04B 7/0404 (2017.01)
  H04L 1/06 (2006.01)

(52) U.S. Cl.
  CPC ............. *H01Q 1/32* (2013.01); *H01Q 1/3283* (2013.01); *H01Q 21/06* (2013.01); *H01Q 21/08* (2013.01); *H04B 7/0404* (2013.01); *H04L 1/06* (2013.01)

(58) Field of Classification Search
  None
  See application file for complete search history.

(56) References Cited

U.S. PATENT DOCUMENTS

2008/0158056 A1* 7/2008 Shima .................. H04B 7/0814
                                                      342/377
2017/0082730 A1* 3/2017 Kishigami ............ G01S 13/325
(Continued)

FOREIGN PATENT DOCUMENTS

JP      H10209936 A   *  8/1998
JP      2001036444 A      2/2001
(Continued)

OTHER PUBLICATIONS

Akihito Kato et al. Technologies of Millimeter-wave Inter-vehicle Communications. Propagation Characteristics. Journal of the Communications Research Laboratory Dec. 2001 p. 97-106 vol. 47 No. 4.

(Continued)

*Primary Examiner* — Ab Salam Alkassim, Jr.

(57) ABSTRACT

An antenna apparatus is provided. The antenna apparatus includes an antenna array including a first plurality of antennas arranged by being shifted in a lateral direction by a distance of an odd integer multiple of a half period of a period of a level fluctuation depending on an antenna lateral position at a first distance that is predetermined as a distance between the antenna apparatus and an antenna apparatus of a communication partner. An antenna apparatus is provided. The antenna apparatus includes an antenna array including a first plurality of antennas arranged by being shifted in a height direction by a distance of an odd integer multiple of a half period of a period of a level fluctuation depending on an antenna height at a first distance that is predetermined as a distance between the antenna apparatus and an antenna apparatus of a communication partner.

10 Claims, 27 Drawing Sheets

(56) References Cited

U.S. PATENT DOCUMENTS

| | | | | |
|---|---|---|---|---|
| 2020/0355788 | A1* | 11/2020 | Kitamura | G01S 13/42 |
| 2020/0412023 | A1* | 12/2020 | Boyes | H01Q 1/246 |
| 2022/0158693 | A1* | 5/2022 | Nakata | H04B 7/0473 |
| 2022/0263234 | A1* | 8/2022 | Boyes | H01Q 9/0421 |
| 2023/0178880 | A1* | 6/2023 | Lee | H01Q 21/28 |
| 2024/0168152 | A1* | 5/2024 | Sasaki | G01S 13/003 |
| 2024/0204826 | A1* | 6/2024 | Tsuchiya | H04B 7/145 |

FOREIGN PATENT DOCUMENTS

| | | | | |
|---|---|---|---|---|
| JP | 2001284930 | A | | 10/2001 |
| JP | 2002271125 | A | | 9/2002 |
| JP | 2004048754 | A | * | 2/2004 |
| JP | 2016208303 | A | * | 12/2016 |
| JP | 2019009530 | A | * | 1/2019 |

OTHER PUBLICATIONS

Yoshio Karasawa Radiowave Propagation Fundamentals for Digital Mobile Communications, 5.4 Angular profile and spatial correlation characteristics pp. 97-99, 8.1 Various types of diapersites and synthesis methods pp. 160-161, 8.3 Maximum ratio combining of correlated branch signals p. 173, Corona Publishing Co., Ltd., First Print of Second Edition, Mar. 2016.

International Search Report and Written Opinion (ISA/237) of the International Search Authority for International Patent Application No. PCT/JP2022/011306, mailed by the Japan Patent Office on Jun. 14, 2022.

Atsushi Yamamoto et al. Radio wave propagation characteristics of 60GHz inter-vehicle communication (1) Proposal of a propagation model that takes into account road surface irregularities, Proceedings of the 2001 IEICE General Conference Basics and Boundaries p. 406 A-17-25.

Atsushi Yamamoto et al. Effect of water on road surface for Inter-vehicle communication in the 60GHz band (2) Fluctuation range of received power on wet road surface under inter-vehicle communication environment, Proceedings of the 2003 IEICE Basics and Boundaries Society Conference p. 187 A-17-16.

Ryoichi Tanaka et al. Study of propagation characteristics on millimeter wave wireless systems, Proceedings of the 2003 IEICE Communication Society Conference1 p. 386 B-5-9.

Extended European Search Report for counterpart European Application No. 22784430.5, issued by the European Patent Office on Oct. 1, 2024.

* cited by examiner $$P_{r1} = 20\log_{10}\left|\underbrace{\frac{\lambda}{4\pi r_1}G_{t,V}(\emptyset_{D1})G_{r,V}(\emptyset_{D1})}_{\text{DIRECT WAVE COMPONENT}} + \underbrace{\frac{\lambda}{4\pi r_1'}G_{t,V}(\emptyset_{R1})G_{r,V}(\emptyset_{R1})\Gamma_e(\emptyset_{R1})\exp\left(-j\frac{2\pi\Delta r_1}{\lambda}\right)}_{\text{REFLECTED WAVE COMPONENT}}\right|$$

$$P_{r2} = 20\log_{10}\left|\underbrace{\frac{\lambda}{4\pi r_2}G_{t,V}(\emptyset_{D2})G_{r,V}(\emptyset_{D2})}_{\text{DIRECT WAVE COMPONENT}} + \underbrace{\frac{\lambda}{4\pi r_2'}G_{t,V}(\emptyset_{R2})G_{r,V}(\emptyset_{R2})\Gamma_e(\emptyset_{R2})\exp\left(-j\frac{2\pi\Delta r_2}{\lambda}\right)}_{\text{REFLECTED WAVE COMPONENT}}\right|$$

$P_d = \text{DIRECT WAVE COMPONENT} \approx \text{REFLECTED WAVE COMPONENT}$ $\Gamma_e(\emptyset_{R1}) \approx \Gamma_e(\emptyset_{R2}) = \Gamma_e$ $$P_{r1} = 20\log_{10}\left|P_d\left\{1 + \Gamma_e\exp\left(-j\frac{2\pi\Delta r_1}{\lambda}\right)\right\}\right| \approx 20\log_{10}\left|P_d\left\{1 + \Gamma_e\cos\left(\frac{2\pi\Delta r_1}{\lambda}\right)\right\}\right|$$

$$P_{r2} = 20\log_{10}\left|P_d\left\{1 + \Gamma_e\exp\left(-j\frac{2\pi\Delta r_2}{\lambda}\right)\right\}\right| \approx 20\log_{10}\left|P_d\left\{1 + \Gamma_e\cos\left(\frac{2\pi\Delta r_2}{\lambda}\right)\right\}\right|$$

FIG.22

ANTENNA APPARATUS, SYSTEM, COMMUNICATION APPARATUS, DATA PROCESSING APPARATUS, AND COMPUTER READABLE STORAGE MEDIUM

The contents of the following patent applications are incorporated herein by reference:
NO. 2021-066609 filed in JP on Apr. 9, 2021
NO. 2021-088762 filed in JP on May 26, 2021
NO. PCT/JP2022/011306 filed in WO on Mar. 14, 2022

BACKGROUND

1. Technical Field

The present invention relates to an antenna apparatus, a system, a communication apparatus, a data processing apparatus, and a computer readable storage medium.

2. Related Art

Non-Patent Document 1 describes effectiveness of a spatial diversity in vehicle-to-vehicle communication. Non-Patent Document 2 describes that an antenna interval for a spatial diversity assumes non-line of sight communication, and it suffices when the antenna interval for the spatial diversity is separated by a half wavelength or more on a mobile station side and separated by 10 wavelengths or more on a base station side.

LIST OF CITED REFERENCES

Non-Patent Documents

Non-Patent Document 1: Akihito Kato, Katsuyoshi Sato, Masayuki Fujise, "Technologies of Millimeter-wave Inter-vehicle Communications—Propagation Characteristics—", Review of the Communications Research Laboratory, vol. 47, no. 4, December 2001

Non-Patent Document 2: Yoshio Karasawa, "Radiowave Propagation Fundamentals for Digital Mobile Communications" Corona Publishing Co., Ltd., First Print of Second Edition, March 2016

BRIEF DESCRIPTION OF THE DRAWINGS

FIG. 22 illustrates expressions representing reception power $P_{r1}$ at an antenna 1412 and reception power $P_{r2}$ at an antenna 1414.

DESCRIPTION OF EXEMPLARY EMBODIMENTS

It is illustrated that a spatial diversity is effective for vehicle-to-vehicle communication (Non-Patent Document 1), but an optimal antenna array configuration method is not mentioned. In general, an antenna interval for a spatial diversity in mobile communication assumes non-line of sight communication, and it suffices when the antenna interval for the spatial diversity is separated by a half wavelength or more on a mobile station side and separated by 10 wavelengths or more on a base station side (Non-Patent Document 2).

The vehicle-to-vehicle communication is line of sight communication, but in the case of the line of sight communication, due to interference of a road surface reflected wave and a lateral reflected wave, a level may periodically fluctuate in an antenna height direction and a horizontal position direction. In a diversity review, it is necessary to optimize an antenna array configuration by taking into account a periodicity of this fluctuation. A system 10 according to the present embodiment includes an antenna array configuration appropriate to the line of sight communication such as the vehicle-to-vehicle communication.

Hereinafter, the present invention will be described through embodiments of the present invention, but the following embodiments do not limit the present invention according to claims. In addition, not all of the combinations of features described in the embodiments are essential to the solving means of the invention.

Figure 1:
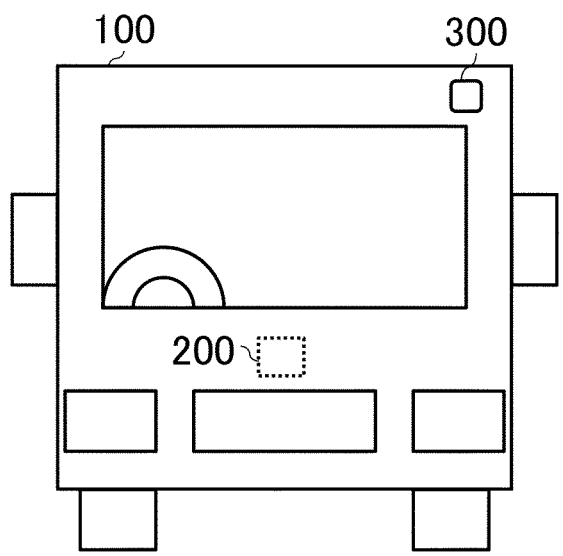
FIG. 1 schematically illustrates an example of a system 10.
Figure 2:
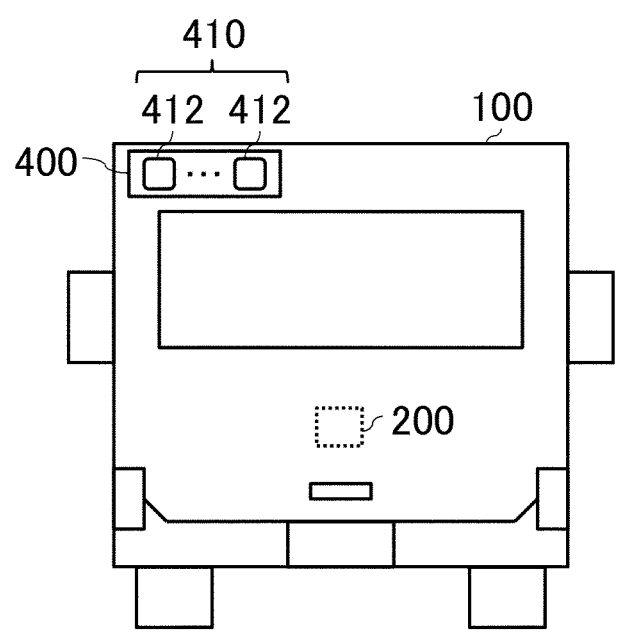
FIG. 2 schematically illustrates an example of the system 10.

FIG. 1 and FIG. 2 schematically illustrate an example of the system 10 according to the present embodiment. The system 10 includes a communication apparatus 200, an antenna unit 400, and a movable object to which the communication apparatus 200 and the antenna unit 400 are mounted. A vehicle 100 in FIG. 1 and FIG. 2 is an example of the movable object. The vehicle 100 may be an automobile.

FIG. 1 schematically illustrates a front of the vehicle 100, and FIG. 2 schematically illustrates a back of the vehicle 100. An antenna 300 is arranged on the front of the vehicle 100. The antenna unit 400 is arranged on the back of the vehicle 100.

The antenna unit 400 includes an antenna array. FIG. 2 exemplifies a case where the antenna unit 400 has an antenna array 410 constituted by a plurality of antennas 412. The antenna unit 400 may be an example of an antenna apparatus. The communication apparatus 200 including the antenna unit 400 may be an example of the antenna apparatus.

By using the antenna 300 and the antenna unit 400, the communication apparatus 200 communicates with a communication apparatus 200 mounted to another vehicle 100 that is different from the vehicle 100 (which may be referred to as its own vehicle) to which the communication apparatus 200 is mounted. For example, by using the antenna 300 and the antenna unit 400, the communication apparatus 200 communicates with another vehicle 100 travelling ahead of its own vehicle or another vehicle 100 travelling behind its own vehicle.

Figure 3:
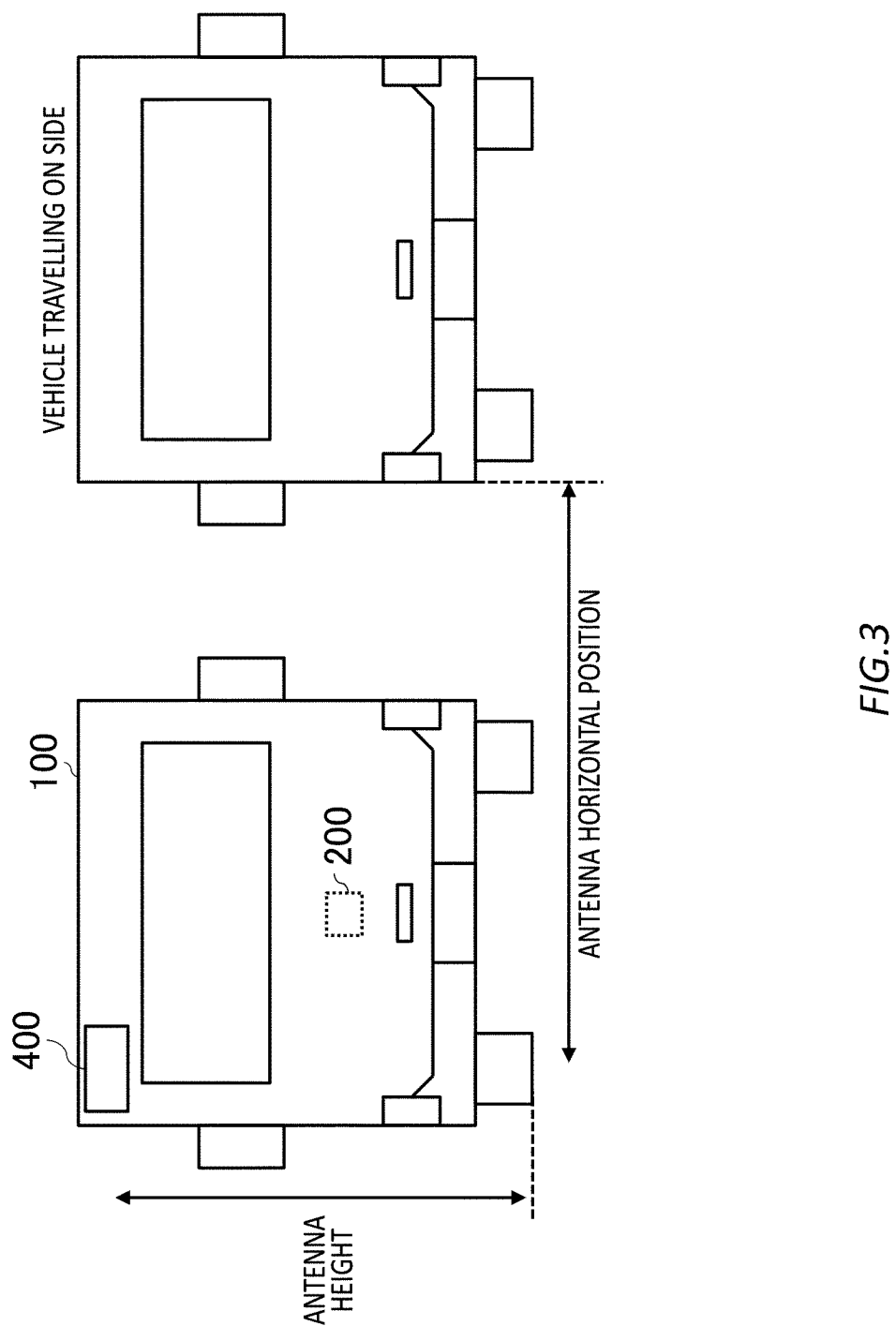
FIG. 3 is an explanatory diagram for describing a fluctuation of a reception level in an antenna height direction and a horizontal position direction of an antenna unit 400.
Figure 4:
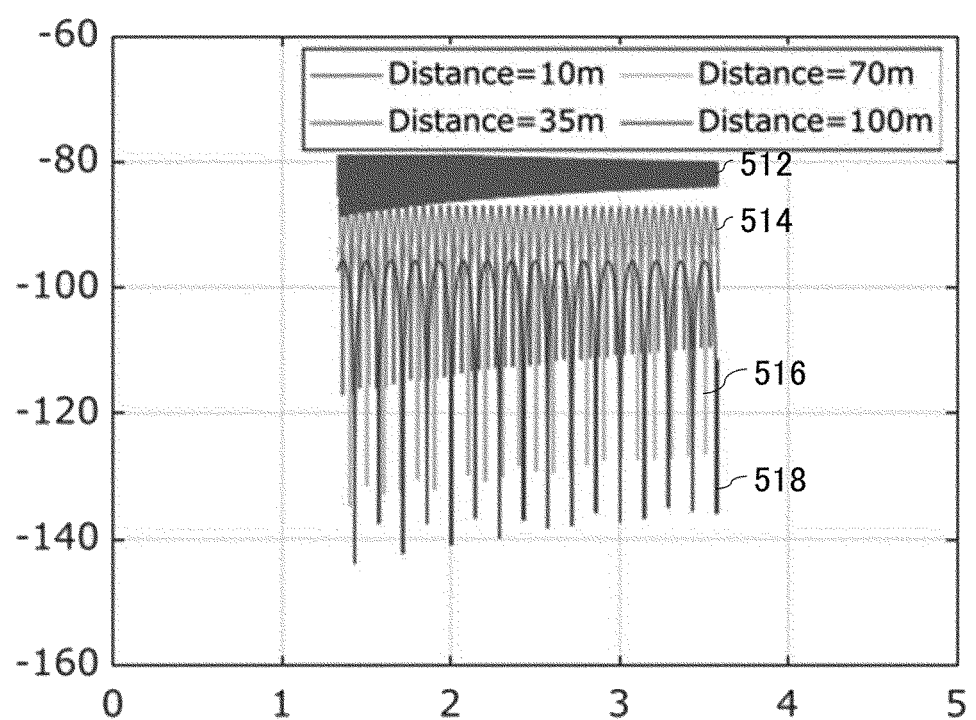
FIG. 4 schematically illustrates an example of a level fluctuation depending on a reception antenna horizontal position when a reception antenna height is fixed.
Figure 5:
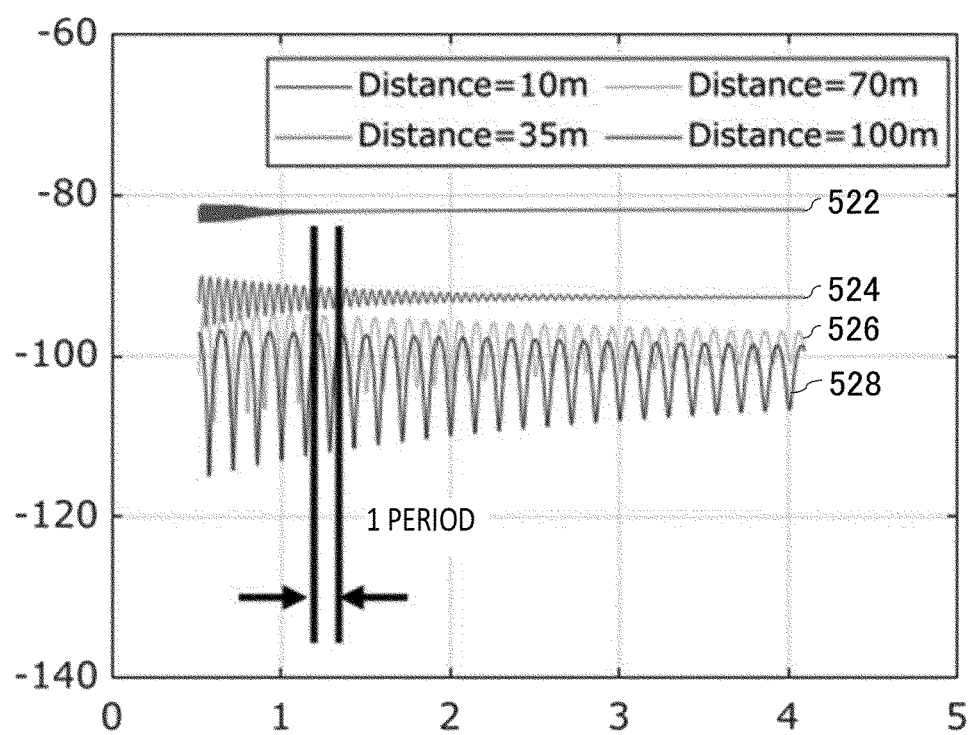
FIG. 5 schematically illustrates an example of a level fluctuation depending on a reception antenna height when a reception antenna horizontal position is fixed.

FIG. 3 is an explanatory diagram for describing a fluctuation of a reception level in an antenna height direction and a horizontal position direction of the antenna unit 400. FIG. 4 schematically illustrates an example of a level fluctuation depending on a reception antenna horizontal position when a reception antenna height is fixed. FIG. 5 schematically illustrates an example of a level fluctuation depending on a reception antenna height when a reception antenna horizontal position is fixed.

The antenna unit 400 receives a radio wave transmitted by an antenna 300 of the another vehicle 100 travelling behind its own vehicle. A road surface reflected wave by a road surface and a lateral reflected wave that is a reflection from another vehicle travelling on a side of its own vehicle (for example, in an adjacent lane) may interfere with the radio wave received by the antenna unit 400. An antenna height is a distance between the antenna unit 400 and a ground. An antenna horizontal position is a distance between the antenna unit 400 and a lateral reflector (vehicle travelling on the side). The antenna horizontal position may be an example of an antenna lateral position.

FIG. 4 illustrates a level fluctuation depending on a reception antenna horizontal position when a reception antenna height is fixed for each inter-vehicle distance between its own vehicle and another vehicle 100 of a communication partner. A level fluctuation 512 represents a case where the inter-vehicle distance is 10 m, a level fluctuation 514 represents a case where the inter-vehicle distance is 35 m, a level fluctuation 516 represents a case where the inter-vehicle distance is 70 m, and a level fluctuation 518 represents a case where the inter-vehicle distance is 100 m. As illustrated in FIG. 4, as the inter-vehicle distance is longer, a period of the fluctuation increases.

FIG. 5 illustrates a level fluctuation depending on a reception antenna height when a reception antenna horizontal position is fixed for each inter-vehicle distance between its own vehicle and another vehicle 100 of a communication partner. A level fluctuation 522 represents a case where the inter-vehicle distance is 10 m, a level fluctuation 524 represents a case where the inter-vehicle distance is 35 m, a level fluctuation 526 represents a case where the inter-vehicle distance is 70 m, and a level fluctuation 528 represents a case where the inter-vehicle distance is 100 m. As illustrated in FIG. 5, as the inter-vehicle distance is longer, the period of the fluctuation increases.

Figure 6:
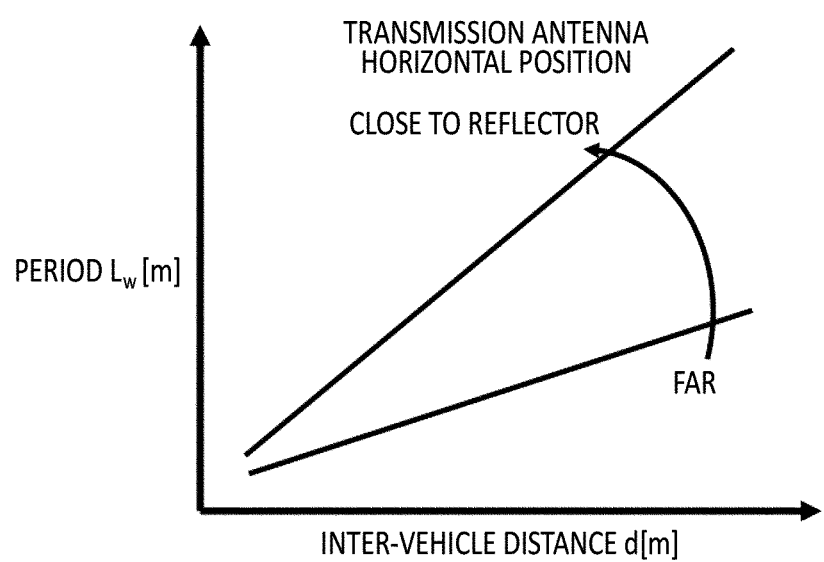
FIG. 6 schematically illustrates an example of a period $L_w$ of a level fluctuation depending on a reception antenna horizontal position when a reception antenna height is fixed.

FIG. 6 schematically illustrates an example of a period $L_w$ of a level fluctuation depending on a reception antenna horizontal position when a reception antenna height is fixed. As illustrated in FIG. 6, as the inter-vehicle distance is longer, the period $L_w$ becomes longer. In addition, as it is closer to the lateral reflector, the period $L_w$ becomes longer.

Figure 7:
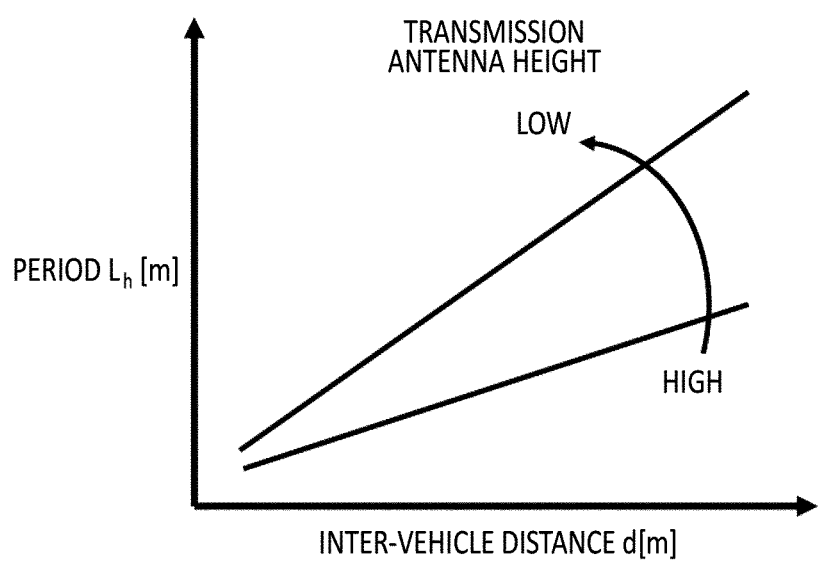
FIG. 7 schematically illustrates an example of a period $L_h$ of a level fluctuation depending on a reception antenna height when a reception antenna horizontal position is fixed.

FIG. 7 schematically illustrates an example of a period $L_h$ of a level fluctuation depending on a reception antenna height when a reception antenna horizontal position is fixed. As illustrated in FIG. 7, as the inter-vehicle distance is longer, the period $L_h$ becomes longer. In addition, as a transmission antenna height is lower, the period $L_h$ becomes longer.

The period of the level fluctuation depends on a transmission antenna height, a transmission antenna horizontal position, and an inter-vehicle distance. Characteristics illustrated in FIG. 6 and FIG. 7 can be specified by being actually measured through an experiment. For example, each characteristic may be specified by performing actual measurement for each frequency to be used, for each inter-vehicle distance, for each antenna height, and for each horizontal position. In addition, the characteristics illustrated in FIG. 6 and FIG. 7 can also be specified by expressions. For example, the period $L_w$ can be specified by the following expression 1, and the period $L_h$ can be specified by the following expression 2.

$$L_w = \lambda d / 2 w_{TX} \qquad \text{[Expression 1]}$$

$$L_h = \lambda d / 2 h_{TX} \qquad \text{[Expression 2]}$$

Where $w_{TX}$ denotes a distance between a transmission antenna and a lateral reflector, and $h_{TX}$ denotes a transmission antenna height. Since the level has a periodicity with respect to an antenna position, a diversity effect cannot be attained by merely setting an antenna interval to be broadly separated. In the present embodiment, a situation is avoided where a plurality of antennas simultaneously become a null point by arranging a plurality of antennas at an odd integer multiple of a half period of a fluctuation period L, that is, at a (2n+1)L/2 interval. Then, by arranging the plurality of antennas at the (2n+1)L/2 interval, the diversity effect can be attained.

Figure 8:
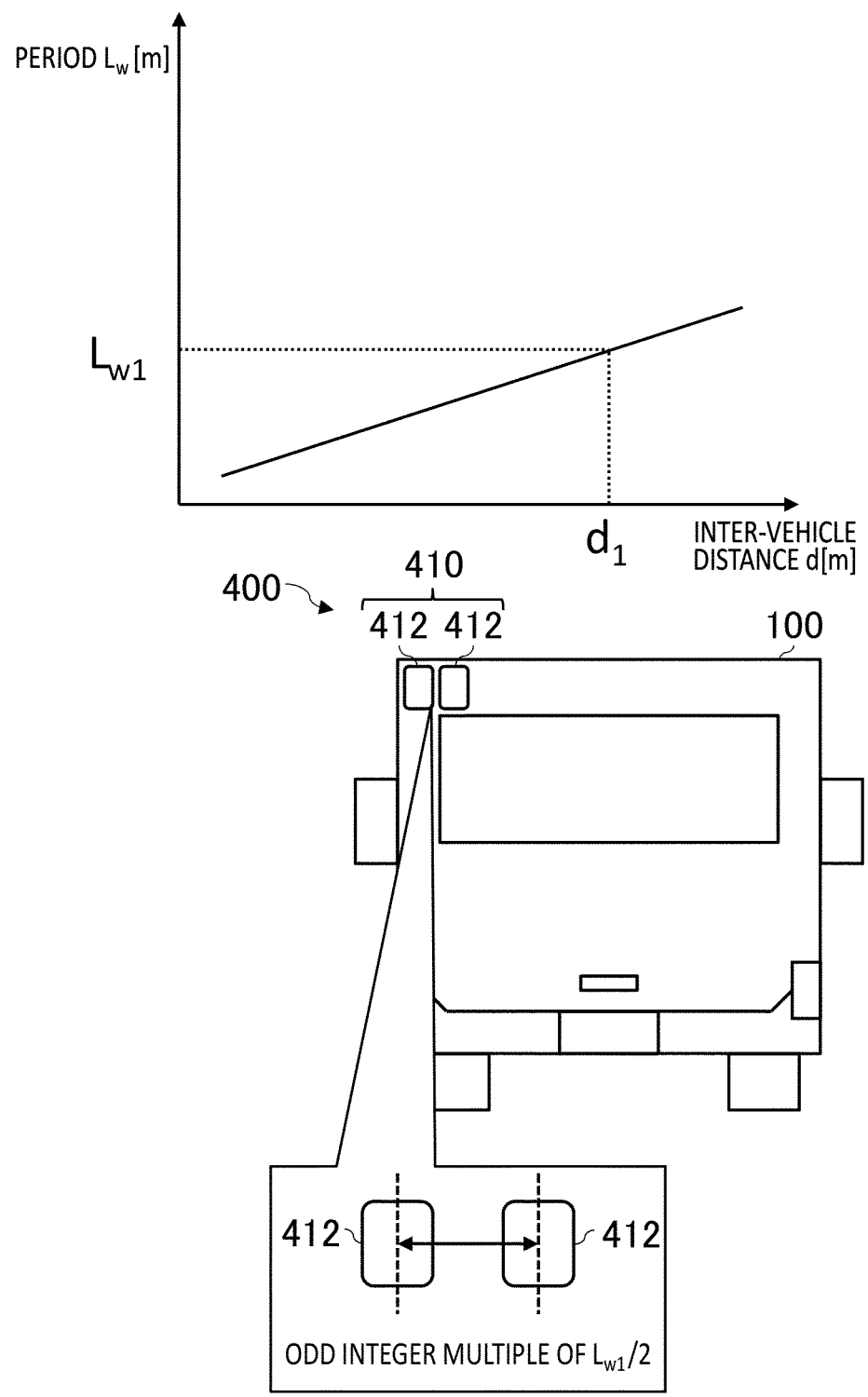
FIG. 8 schematically illustrates an example of a configuration of the antenna unit 400.

FIG. 8 schematically illustrates an example of a configuration of the antenna unit 400. The antenna unit 400 includes the antenna array 410. In the example illustrated in FIG. 8, the antenna array 410 includes two antennas 412. The two antennas 412 are arranged by being shifted in a horizontal direction by a distance of an odd integer multiple of a half period of a period $L_{w1}$ of a level fluctuation depending on an antenna horizontal position at an inter-vehicle distance $d_1$. The horizontal direction may be an example of a lateral direction. With this configuration, the two antennas are arranged such that even when a level of one antenna 412 out of the two antennas 412 becomes the null point, a level of another antenna 412 becomes high, and therefore a situation can be avoided where the levels simultaneously become the null point.

FIG. 8 exemplifies a case where the antenna array 410 includes the two antennas 412, but the antenna array 410 may include three or more antennas 412. The three or more antennas 412 may be arranged by being shifted in the horizontal direction by a distance of an odd integer multiple of the half period of the period $L_{w1}$ of the level fluctuation depending on the antenna horizontal position at the inter-vehicle distance $d_1$.

A distance between a plurality of antennas 412 may be tunable by physical tuning or the like. The distance between the plurality of antennas 412 may be tunable by electronical tuning or the like.

The inter-vehicle distance $d_1$ may be a distance which is predetermined as a distance between the vehicle 100 (which may be referred to as its own vehicle) to which the antenna unit 400 is mounted and a vehicle 100 of a communication partner. For example, the inter-vehicle distance $d_1$ may be an average inter-vehicle distance among a large number of vehicles. In addition, for example, the inter-vehicle distance $d_1$ may be a distance which is set by manufacturers of the communication apparatus 200 and the antenna unit 400, a manufacturer of the vehicle 100 to which the communication apparatus 200 and the antenna unit 400 are mounted, or the like. The inter-vehicle distance $d_1$ may be a distance which is predetermined as a maximum distance between the vehicle 100 (which may be referred to as its own vehicle) to which the antenna unit 400 is mounted and the vehicle 100 of the communication partner. For example, when a guaranteed communication distance for wireless communication using the antenna 300 and the antenna unit 400 by the communication apparatus 200 is 100 m, the inter-vehicle distance $d_1$ may be 100 m.

The plurality of antennas 412 may be arranged by being shifted in the horizontal direction, and also being shifted in the height direction. The height direction may be, for example, a vertical direction. For example, the plurality of antennas 412 may be arranged by being shifted in the horizontal direction by a distance of an odd integer multiple of the half period of the period $L_{w1}$ of the level fluctuation depending on the antenna horizontal position at the inter-vehicle distance $d_1$ and also being shifted in the height direction by a distance of an odd integer multiple of a half period of a period $L_{h1}$ of a level fluctuation depending on an antenna height at the inter-vehicle distance $d_1$. With this configuration, a quality of reception by the antenna unit 400 can be further improved.

Figure 9:
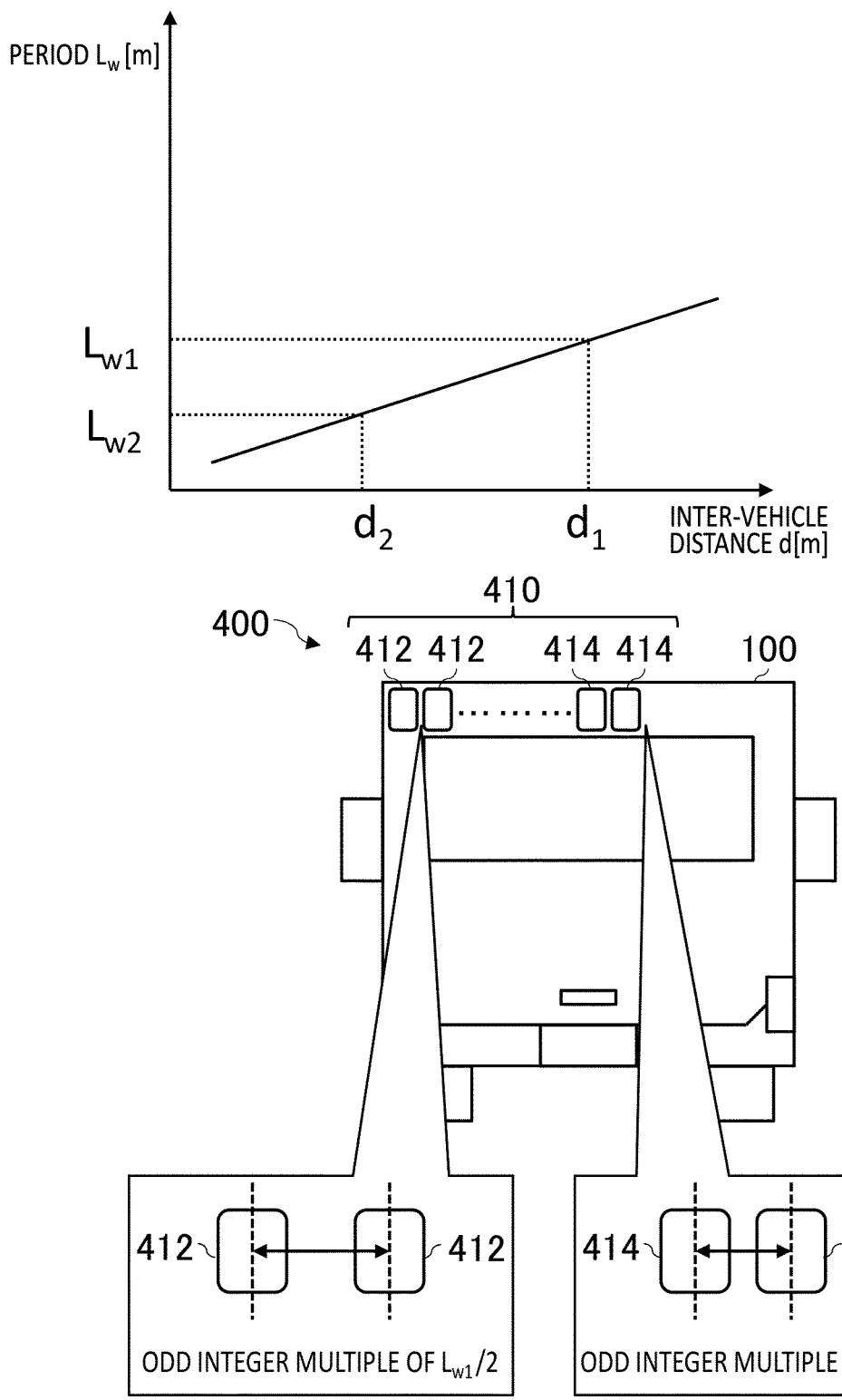
FIG. 9 schematically illustrates an example of the configuration of the antenna unit 400.

FIG. 9 schematically illustrates an example of the configuration of the antenna unit 400. Here, differences from FIG. 8 will be mainly described. The antenna array 410 illustrated in FIG. 9 includes a plurality of antenna sets. FIG. 9 exemplifies a first antenna set including two antennas 412 and a second antenna set including two antennas 414.

The two antennas 412 are arranged by being shifted in the horizontal direction by a distance of an odd integer multiple of the half period of the period $L_{w1}$ of the level fluctuation depending on the antenna horizontal position at the inter-vehicle distance $d_1$, and the two antennas 414 are arranged by being shifted in the horizontal direction by a distance of an odd integer multiple of a half period of a period $L_{w2}$ of a level fluctuation depending on an antenna horizontal position at an inter-vehicle distance $d_2$.

Since a period of the level fluctuation depends on an inter-vehicle distance, an inter-vehicle distance that cannot be dealt with by only a single antenna set exists. On the other hand, when the two antenna sets as illustrated in FIG. 9 are provided, it is possible to increase the number of inter-vehicle distances that can be dealt with. The communication apparatus 200 may adopt one of the plurality of antenna sets with a better status of reception or may complement each other by using both.

The two antennas 412 and the two antennas 414 may be arranged by being shifted in the horizontal direction, and also being shifted in the height direction. For example, the two antennas 412 may be arranged by being shifted in the horizontal direction by a distance of an odd integer multiple of the half period of the period $L_{w1}$ of the level fluctuation depending on the antenna horizontal position at the inter-vehicle distance $d_1$, and also being shifted in the height direction by a distance of an odd integer multiple of the half period of the period $L_{h1}$ of the level fluctuation depending on the antenna height at the inter-vehicle distance $d_1$. In addition, the two antennas 414 may be arranged by being shifted in the horizontal direction by a distance of an odd integer multiple of the half period of the period $L_{w2}$ of the level fluctuation depending on the antenna horizontal position at the inter-vehicle distance $d_2$, and also being shifted in the horizontal direction by a distance of an odd integer multiple of a half period of a period $L_{h2}$ of a level fluctuation depending on an antenna height at the inter-vehicle distance $d_2$. With this configuration, the quality of reception by the antenna unit 400 can be further improved.

FIG. 9 exemplifies a case where each of the two antenna sets includes two antennas, but each of the two antenna sets may include three or more antennas. The three or more antennas 412 may be arranged by being shifted in the horizontal direction by a distance of an odd integer multiple of the half period of the period $L_{w1}$ of the level fluctuation depending on the antenna horizontal position at the inter-vehicle distance $d_1$. The three or more antennas 414 may be arranged by being shifted in the horizontal direction by a distance of an odd integer multiple of the half period of the period $L_{w2}$ of the level fluctuation depending on the antenna horizontal position at the inter-vehicle distance $d_2$.

FIG. 9 exemplifies the two antenna sets, but the antenna array 410 may include three or more antenna sets. In this case, each of the plurality of antenna sets may correspond to each of a plurality of different inter-vehicle distances. That is, the antenna array 410 may use, in addition to an antenna set including a plurality of antennas 412, an antenna set N including antennas arranged by being offset by an odd integer multiple of a half period of a period $L_{wN}$ of a level fluctuation depending on an antenna horizontal position at a plurality of inter-vehicle distances as a diversity in conjunction (N=2, 3, . . . ). With regard to each of the plurality of antenna sets, a distance between a plurality of antennas may be tunable by physical tuning or the like. The distance between the plurality of antennas may be tunable by electronical tuning or the like.

Figure 10:
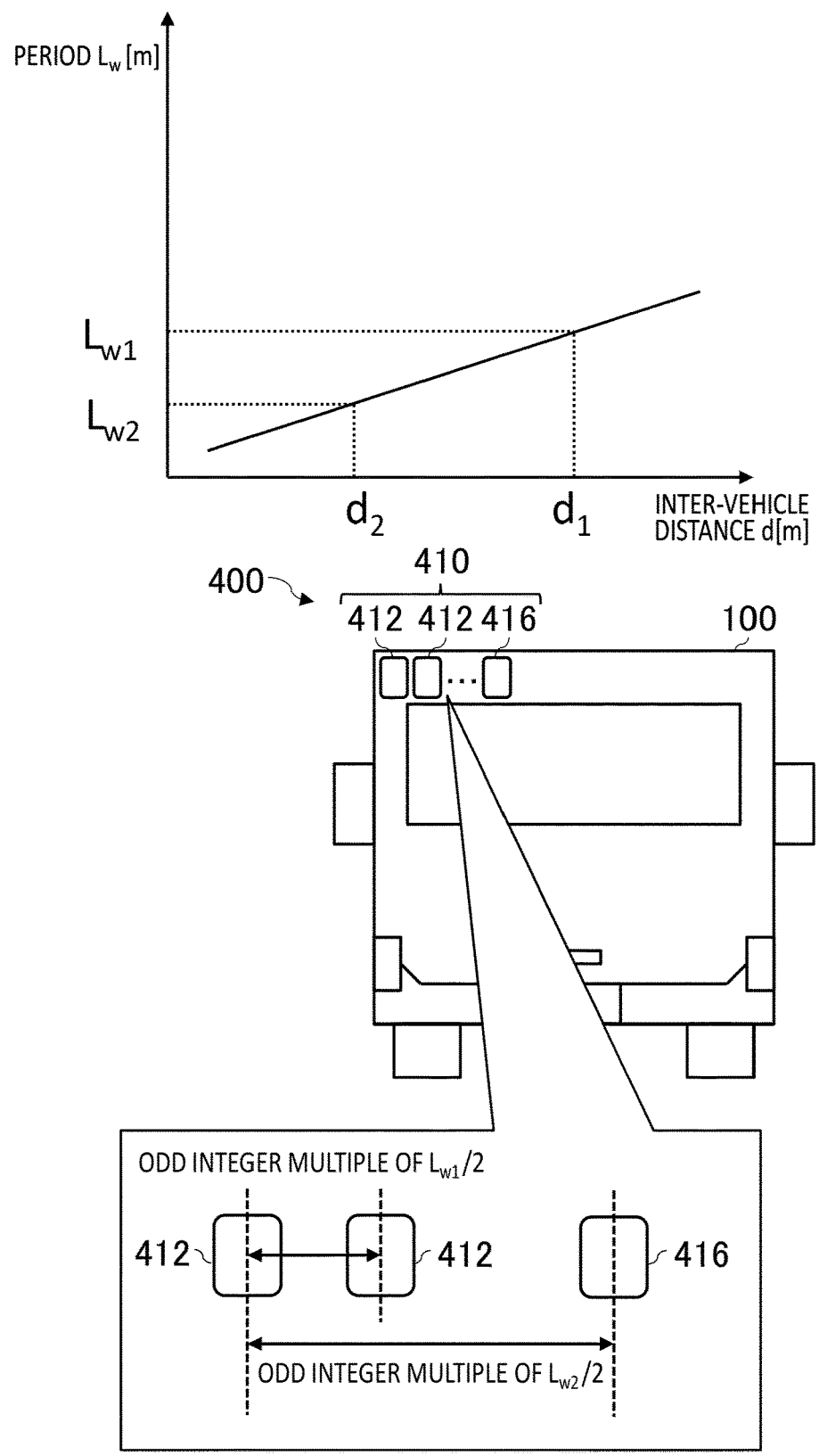
FIG. 10 schematically illustrates an example of the configuration of the antenna unit 400.

FIG. 10 schematically illustrates an example the configuration of the antenna unit 400. Here, differences from FIG. 8 will be mainly described. The antenna array 410 illustrated in FIG. 10 includes at least one antenna in addition to a single antenna set. FIG. 10 exemplifies an antenna set including two antennas 412, and an antenna 416.

The antenna 416 is arranged by being shifted, with respect to at least any of the plurality of antennas 412, in the horizontal direction by a distance of an odd integer multiple of the half period of the period $L_{w2}$ of the level fluctuation depending on the antenna horizontal position at the inter-vehicle distance $d_2$. With this configuration, as compared with the example illustrated in FIG. 9, it is possible to increase the number of the inter-vehicle distances that can be dealt with in a small device scale. Specifically, in the example illustrated in FIG. 10, both the inter-vehicle distance $d_1$ and the inter-vehicle distance $d_2$ can be dealt with. Note that in the example illustrated in FIG. 10, the antenna 416 is arranged by being shifted, with respect to the antenna 412 on a left side, by an odd integer multiple of $L_{w2}/2$. For example, when a shift with respect to the antenna 412 on a right side is a distance of an odd integer multiple of a half period of a period $L_{w3}$ of a level fluctuation depending on an antenna horizontal position at an inter-vehicle distance $d_3$, it is also possible to deal with the inter-vehicle distance $d_3$.

The antenna 416 may be shifted, with respect to at least any of the plurality of antennas 412, in the horizontal direction and also in the height direction. For example, the antenna 416 may be arranged by being shifted, with respect to at least any of the plurality of antennas 412, in the horizontal direction by a distance of an odd integer multiple of the half period of the period $L_{w2}$ of the level fluctuation depending on the antenna horizontal position at the inter-vehicle distance $d_2$, and also being shifted, with respect to at least any of the plurality of antennas 412, in the height direction by a distance of an odd integer multiple of the half period of the period $L_{h2}$ of the level fluctuation depending on the antenna height at the inter-vehicle distance $d_2$.

The antenna array 410 may further include an antenna in addition to the plurality of antennas 412 and the antenna 416. Each of a plurality of antennas other than the plurality of antennas 412 may correspond to a different inter-vehicle distance other than the inter-vehicle distance $d_1$. That is, the antenna array 410 may use, in addition to an antenna set including a plurality of antennas 412, an antenna N arranged by being offset by an odd integer multiple of a half period of a period $L_{wN}$ of a level fluctuation depending on an antenna horizontal position at a plurality of inter-vehicle distances as a diversity in conjunction (N=2, 3, ... ). A position of the antenna N may be tunable by physical tuning or the like. The position of the antenna N may be tunable by electronical tuning or the like.

Figure 11:
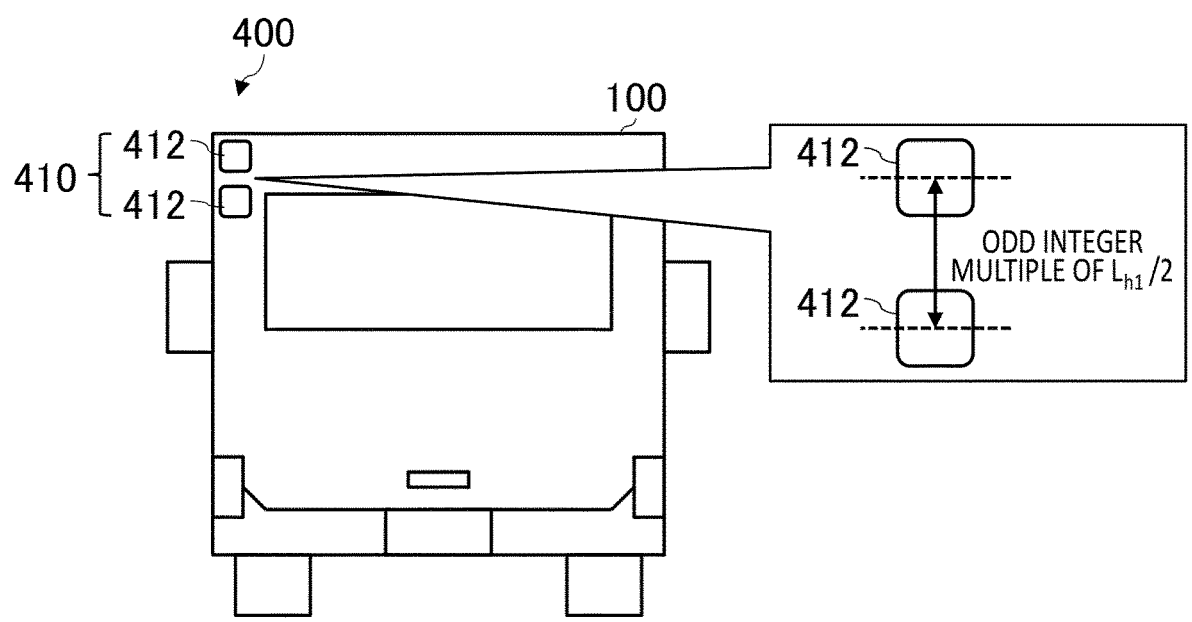
FIG. 11 schematically illustrates an example of the configuration of the antenna unit 400.

FIG. 11 schematically illustrates an example of the configuration of the antenna unit 400. The antenna unit 400 includes the antenna array 410. In the example illustrated in FIG. 11, the antenna array 410 includes two antennas 412. The two antennas 412 are arranged by being shifted in the height direction by a distance of an odd integer multiple of the half period of the period $L_{h1}$ of the level fluctuation depending on the antenna height at the inter-vehicle distance $d_1$. With this configuration, the two antennas are arranged such that even when a level of one antenna 412 out of the two antennas 412 becomes the null point, a level of another antenna 412 becomes high, and therefore a situation can be avoided where the levels simultaneously become the null point.

FIG. 11 exemplifies a case where the antenna array 410 includes the two antennas 412, but the antenna array 410 may include three or more antennas 412. The three or more antennas 412 may be arranged by being shifted in the height direction by a distance of an odd integer multiple of the half period of the period $L_{h1}$ of the level fluctuation depending on the antenna height at the inter-vehicle distance $d_1$.

A distance between a plurality of antennas 412 may be tunable by physical tuning or the like. The distance between the plurality of antennas 412 may be tunable by electronical tuning or the like.

Figure 12:
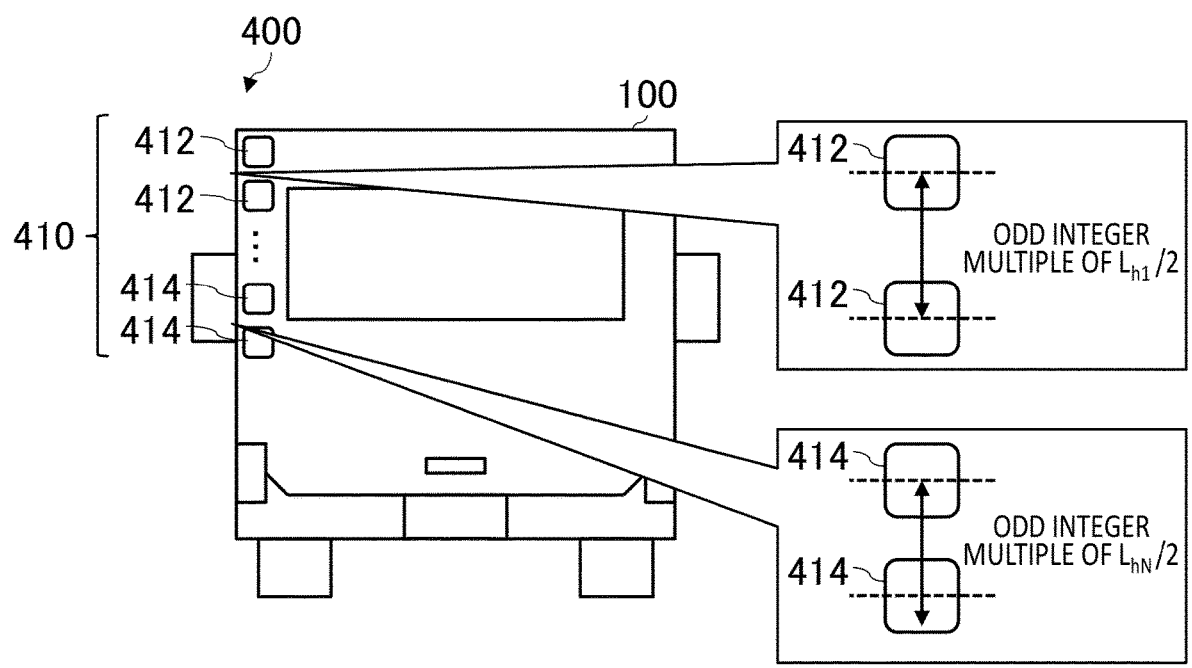
FIG. 12 schematically illustrates an example of the configuration of the antenna unit 400.

FIG. 12 schematically illustrates an example of the configuration of the antenna unit 400. Here, differences from FIG. 11 will be mainly described. The antenna array 410 illustrated in FIG. 12 includes a plurality of antenna sets. FIG. 12 exemplifies a first antenna set including two antennas 412 and a second antenna set including two antennas 414.

The two antennas 412 are arranged by being shifted in the height direction by a distance of an odd integer multiple of the half period of the period $L_{h1}$ of the level fluctuation depending on the antenna height at the inter-vehicle distance $d_1$, and the two antennas 414 are arranged being shifted in the height direction by a distance of an odd integer multiple of the half period of the period $L_{h2}$ of the level fluctuation depending on the antenna height at the inter-vehicle distance $d_2$.

Since a period of the level fluctuation depends on an inter-vehicle distance, an inter-vehicle distance that cannot be dealt with by only a single antenna set exists. On the other hand, when the two antenna sets as illustrated in FIG. 12 are provided, it is possible to increase the number of inter-vehicle distances that can be dealt with. The communication apparatus 200 may adopt one of the plurality of antenna sets with a better status of reception or may complement each other by using both.

FIG. 12 exemplifies a case where each of the two antenna sets includes two antennas, but each of the two antenna sets may include three or more antennas. The three or more antennas 412 may be arranged by being shifted in the height direction by a distance of an odd integer multiple of the half period of the period $L_{h1}$ of the level fluctuation depending on the antenna height at the inter-vehicle distance $d_1$. The three or more antennas 414 may be arranged by being shifted in the height direction by a distance of an odd integer multiple of the half period of the period $L_{h2}$ of the level fluctuation depending on the antenna height at the inter-vehicle distance $d_2$.

FIG. 12 exemplifies the two antenna sets, but the antenna array 410 may include three or more antenna sets. In this case, each of the plurality of antenna sets may correspond to each of a plurality of different inter-vehicle distances. That is, the antenna array 410 may use, in addition to an antenna set including a plurality of antennas 412, an antenna set N including a plurality of antennas arranged by being offset by an odd integer multiple of a half period of a period $L_{hN}$ of a level fluctuation depending on an antenna height at a plurality of inter-vehicle distances as a diversity in conjunction (N=2, 3, ... ). With regard to each of the plurality of antenna sets, a distance between a plurality of antennas may be tunable by physical tuning or the like. The distance between the plurality of antennas may be tunable by electronical tuning or the like.

Figure 13:
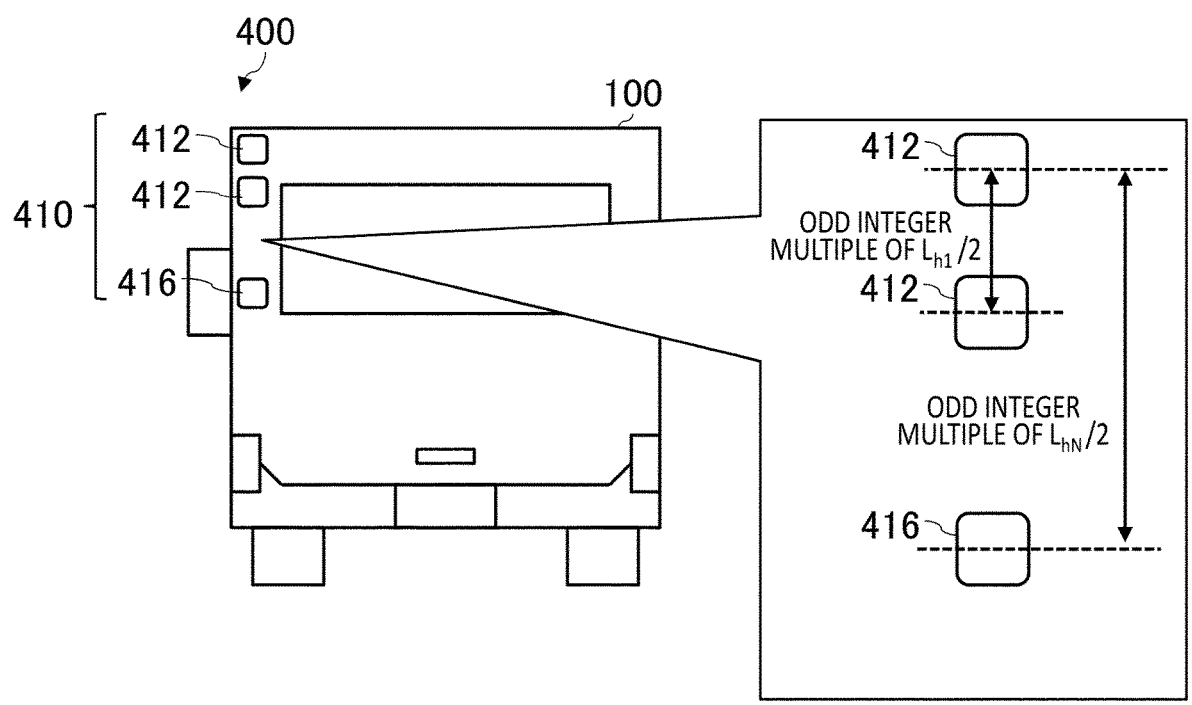
FIG. 13 schematically illustrates an example of the configuration of the antenna unit 400.

FIG. 13 schematically illustrates an example of the configuration of the antenna unit 400. Here, differences from FIG. 11 will be mainly described. The antenna array 410 illustrated in FIG. 13 includes at least one antenna in addition to a single antenna set. FIG. 13 exemplifies an antenna set including two antennas 412, and the antenna 416.

The antenna 416 is arranged by being shifted, with respect to at least any of the plurality of antennas 412, in the height direction by a distance of an odd integer multiple of the half period of the period $L_{h2}$ of the level fluctuation depending on the antenna height at the inter-vehicle distance $d_2$. With this configuration, as compared with the example illustrated in FIG. 11, it is possible to increase the number of the inter-vehicle distances that can be dealt with in a small device scale.

The antenna array 410 may further include an antenna in addition to the plurality of antennas 412 and the antenna 416. Each of a plurality of antennas other than the plurality of antennas 412 may correspond to a different inter-vehicle distance other than the inter-vehicle distance $d_1$. That is, the antenna array 410 may use, in addition to an antenna set including a plurality of antennas 412, an antenna N arranged by being offset by an odd integer multiple of a half period of a period $L_{hN}$ of a level fluctuation depending on an antenna height at a plurality of inter-vehicle distances as a diversity in conjunction (N=2, 3, . . . ). A position of the antenna N may be tunable by physical tuning or the like. The position of the antenna N may be tunable by electronical tuning or the like.

Figure 14:
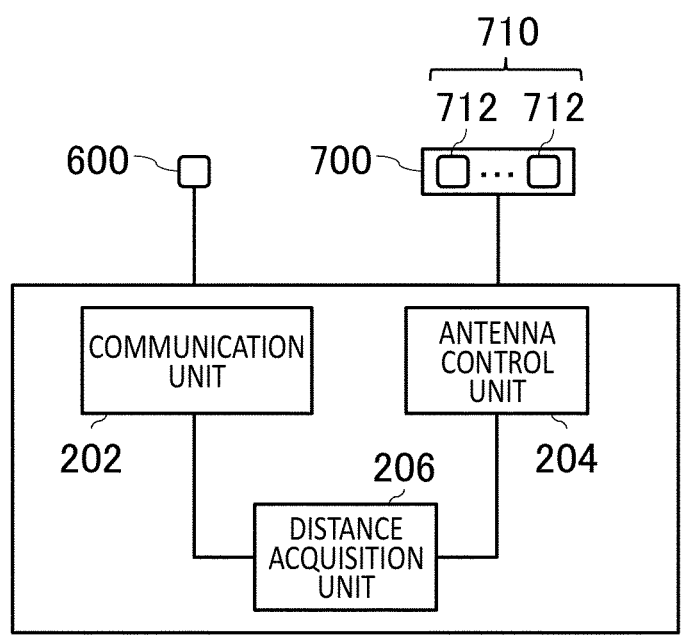
FIG. 14 schematically illustrates an example of a functional configuration of a communication apparatus 200.

FIG. 14 schematically illustrates another example of the communication apparatus 200. The communication apparatus 200 illustrated in FIG. 14 performs communication using an antenna 600 and an antenna unit 700. The antenna 600 may be arranged on the front of the vehicle 100 similarly as in the antenna 300, for example. The antenna unit 700 may be arranged on the back of the vehicle 100 similarly as in the antenna unit 400, for example. An antenna array 710 includes a plurality of antennas 712.

The communication apparatus 200 includes a communication unit 202, an antenna control unit 204, and a distance acquisition unit 206. The communication unit 202 performs communication using the antenna 600 and the antenna unit 700. In addition, the communication unit 202 may communicate with a control device of the vehicle 100 to which the communication apparatus 200 is mounted.

The antenna control unit 204 controls the plurality of antennas 712. The plurality of antennas 712 may be configured such that positions thereof are changeable. The plurality of antennas 712 may be configured such that the positions are changeable in the horizontal direction. The plurality of antennas 712 may be configured such that the positions are changeable in the height direction. The plurality of antennas 712 may be configured such that the positions are changeable in the horizontal direction and the height direction.

The distance acquisition unit 206 acquires a distance between the vehicle 100 to which the communication apparatus 200 is mounted and the vehicle 100 to which the communication partner of the communication apparatus 200 is mounted. The distance acquisition unit 206 acquires the distance from a control device of the vehicle 100, for example. The vehicle 100 may include a sensor which measures a distance to the vehicle 100 which travels ahead, and a sensor which measures a distance to the vehicle 100 which travels behind, and the control device of the vehicle 100 may notify the communication apparatus 200 of a distance measured by the sensor. In addition, the communication apparatus 200 may include a sensor which measures a distance to the vehicle 100 which travels ahead of its own vehicle and a sensor which measures a distance to the vehicle 100 which travels behind its own vehicle.

The antenna control unit 204 may control the positions of the plurality of antennas 412 based on the distance acquired by the distance acquisition unit 206. For example, the antenna control unit 204 controls the positions of the plurality of antennas 712 to be shifted in the horizontal direction by a distance of an odd integer multiple of a half period of a period of a level fluctuation depending on an antenna horizontal position at the distance acquired by the distance acquisition unit 206. For example, the antenna control unit 204 controls the positions of the plurality of antennas 712 to be shifted in the height direction by a distance of an odd integer multiple of a half period of a period of a level fluctuation depending on an antenna height at the distance acquired by the distance acquisition unit 206. Since the antenna control unit 204 controls the positions of the plurality of antennas 712 according to the distance appropriately acquired by the distance acquisition unit 206, the quality of reception can be improved, and the diversity effect can be improved.

The vehicle-to-vehicle communication is line of sight communication, but in the case of the line of sight communication, due to interference of a road surface reflected wave and a lateral reflected wave, a level may periodically fluctuate in an antenna height direction and a horizontal position direction, and a period thereof depends on an inter-vehicle distance. In a diversity review, it is necessary to optimize the antenna array configuration by taking into account a periodicity of this fluctuation, but a distance at which a state where the plurality of antennas simultaneously become a null point cannot be avoided may exist. The system 10 according to the present embodiment includes an antenna array configuration appropriate to the line of sight communication such as the vehicle-to-vehicle communication.

Figure 15:
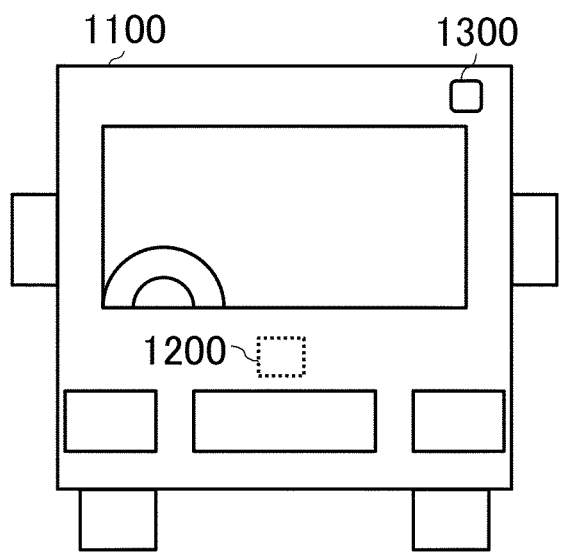
FIG. 15 schematically illustrates an example of a system 20.
Figure 16:
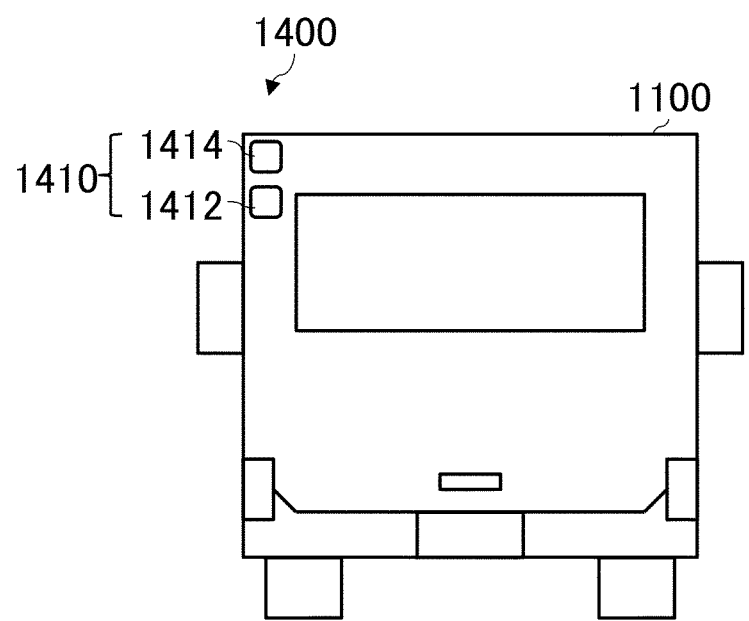
FIG. 16 schematically illustrates an example of the system 20.

FIG. 15 and FIG. 16 schematically illustrate an example of a system 20 according to the present embodiment. The system 20 includes a communication apparatus 1200, an antenna unit 1400, and a movable object to which the communication apparatus 1200 and the antenna unit 1400 are mounted. A vehicle 1100 in FIG. 15 and FIG. 16 is an example of the movable object. The vehicle 1100 may be an automobile.

FIG. 15 schematically illustrates a front of the vehicle 1100, and FIG. 16 schematically illustrates a back of the vehicle 1100. The antenna 1300 is arranged on the front of the vehicle 1100. The antenna unit 1400 is arranged on the back of the vehicle 1100.

The antenna unit 1400 includes an antenna array. FIG. 16 exemplifies a case where the antenna unit 1400 has an antenna array 1410 constituted by an antenna 1412 and an antenna 1414. The antenna unit 1400 may be an example of the antenna apparatus. The communication apparatus 1200 including the antenna unit 1400 may be an example of the antenna apparatus.

By using the antenna 1300 and the antenna unit 1400, the communication apparatus 1200 communicates with a communication apparatus 200 mounted to another vehicle 1100 that is different from the vehicle 100 (which may be referred to as its own vehicle) to which the communication apparatus 1200 is mounted. For example, by using the antenna 1300 and the antenna unit 1400, the communication apparatus 1200 communicates with another vehicle 1100 travelling ahead of its own vehicle or another vehicle 1100 travelling behind its own vehicle.

The antenna unit 1400 according to the present embodiment includes the antenna 1412 and the antenna 1414 which are arranged by being shifted, along a direction from an antenna 1300 of a communication partner to a reflector which reflects a radio wave emitted from the antenna 1300 by a reception antenna interval that is specified based on the distance between the antenna 1300 and the reflector. The antenna 1300 may be an example of a transmission antenna. The antenna 1412 may be an example of a first reception antenna. The antenna 1414 may be an example of a second reception antenna.

In the example illustrated in FIG. 15 and FIG. 16, a case is exemplified where the reflector is a ground, the antenna array 1410 includes the antenna 1412 and the antenna 1414 which are arranged by being shifted, along a direction perpendicular to the ground, by a reception antenna interval specified based on an antenna height of the antenna 1300. In this manner, when the reflector is assumed as the ground, the antenna 1412 and the antenna 1414 may be arranged by being shifted in a height direction, that is, a direction perpendicular to the ground. When the reflector is assumed as another vehicle which passes through the side or a side wall of a tunnel or the like, the antenna 1412 and the antenna 1414 may be arranged by being shifted in a lateral direction, that is, a direction parallel to the ground.

The antenna 1412 and the antenna 1414 may be arranged by being shifted by a reception antenna interval specified by the distance between the antenna 1300 and the reflector, and distance interval data indicating a reception antenna interval for each distance between the antenna 1300 and the reflector. An example of an approach for generating the distance interval data will be described by using FIG. 17 to FIG. 20.

Figure 17:
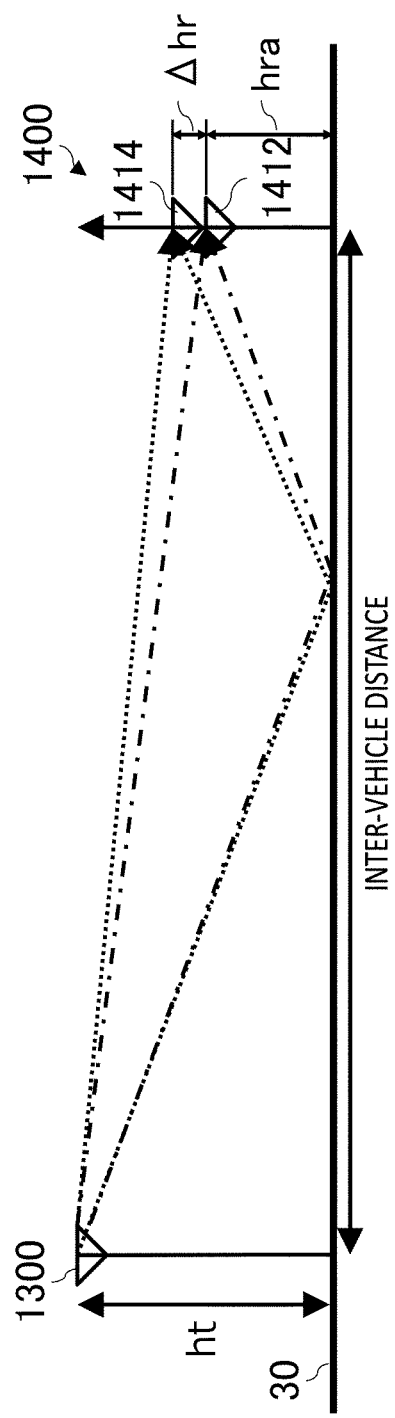
FIG. 17 is an explanatory diagram for describing a radio wave which is transmitted by an antenna 1300 and received by an antenna unit 1400 of a communication partner.

FIG. 17 is an explanatory diagram for describing a radio wave which is transmitted by the antenna 1300 and received by the antenna unit 1400 of the communication partner. A transmission antenna height ht indicates an antenna height that is a distance between the antenna 1300 and a ground 30. A reception antenna height hra indicates a reception antenna height that is a distance between the antenna 1412 and the ground 30. A reception antenna interval Δhr indicates an interval between the antenna 1412 and the antenna 1414. The inter-vehicle distance is equivalent to a distance between the antenna 1300 and the antenna 1412 and the antenna 1414.

Figure 18:
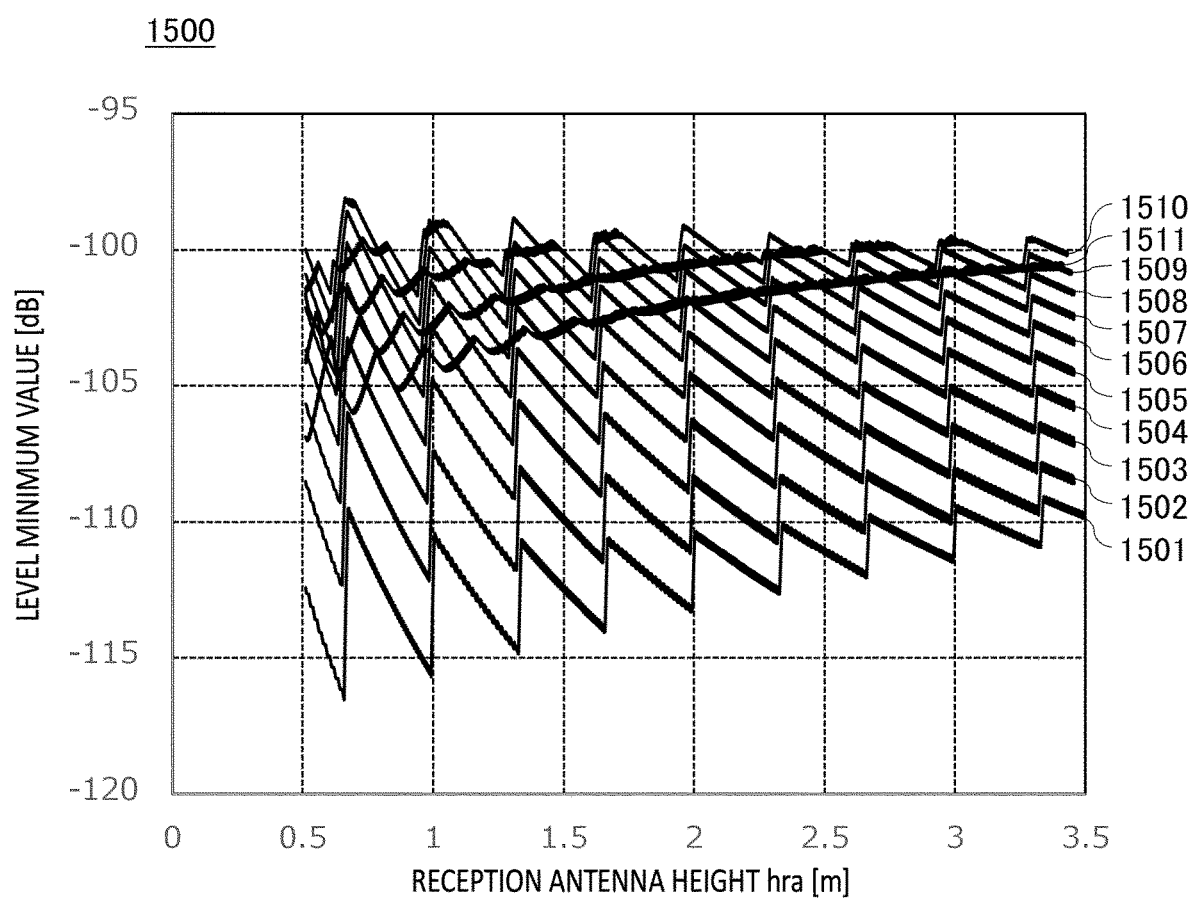
FIG. 18 schematically illustrates an example of graph data 1500 indicating a level minimum value when an inter-vehicle distance varies for each reception antenna height.

FIG. 18 schematically illustrates an example of graph data 1500 indicating a level minimum value when an inter-vehicle distance varies for each reception antenna height. FIG. 18 exemplifies the graph data 1500 when the transmission antenna height ht of the antenna 1300 is 1.5 m.

A horizontal axis of the graph data 1500 is a reception antenna height hra of the antenna 1412, and a vertical axis is a minimum value of a level of a radio wave to be received from the antenna 1300 by the antenna 1412 or a level of a radio wave to be received from the antenna 1300 by the antenna 1414, whichever is higher, when the inter-vehicle distance is varied. A level minimum value 1501 indicates a case where an interval (which may be referred to as a reception antenna interval) between the antenna 1412 and the antenna 1414 is 0.015 m, a level minimum value 1502 indicates a case where the interval is 0.030 m, a level minimum value 1503 indicates a case where the interval is 0.045 m, a level minimum value 1504 indicates a case where the interval is 0.060 m, a level minimum value 1505 indicates a case where the interval is 0.075 m, a level minimum value 1506 indicates a case where the interval is 0.090 m, a level minimum value 1507 indicates a case where the interval is 0.105 m, a level minimum value 1508 indicates a case where the interval is 0.119 m, a level minimum value 1509 indicates a case where the interval is 0.134 m, a level minimum value 1510 indicates a case where the interval is 0.149 m, and a level minimum value 1511 indicates a case where the interval is 0.164 m.

The graph data 1500 can be generated by a simulation. The graph data 1500 can be generated by using a simulator which can output a level of a radio wave to be received from the antenna 1300 by the antenna 1412 and the antenna 1414 by designating, for example, an arrangement, a radio wave setting, and the like of the antenna 1300, the antenna 1412, and the antenna 1414.

The graph data 1500 can also be generated by an actual measurement. The graph data 1500 can be generated by measuring a level of a radio wave to be received from the antenna 1300 by the antenna 1412 and the antenna 1414 while changing, for example, the arrangement, the radio wave setting, and the like of the antenna 1300, the antenna 1412, and the antenna 1414.

Figure 19:
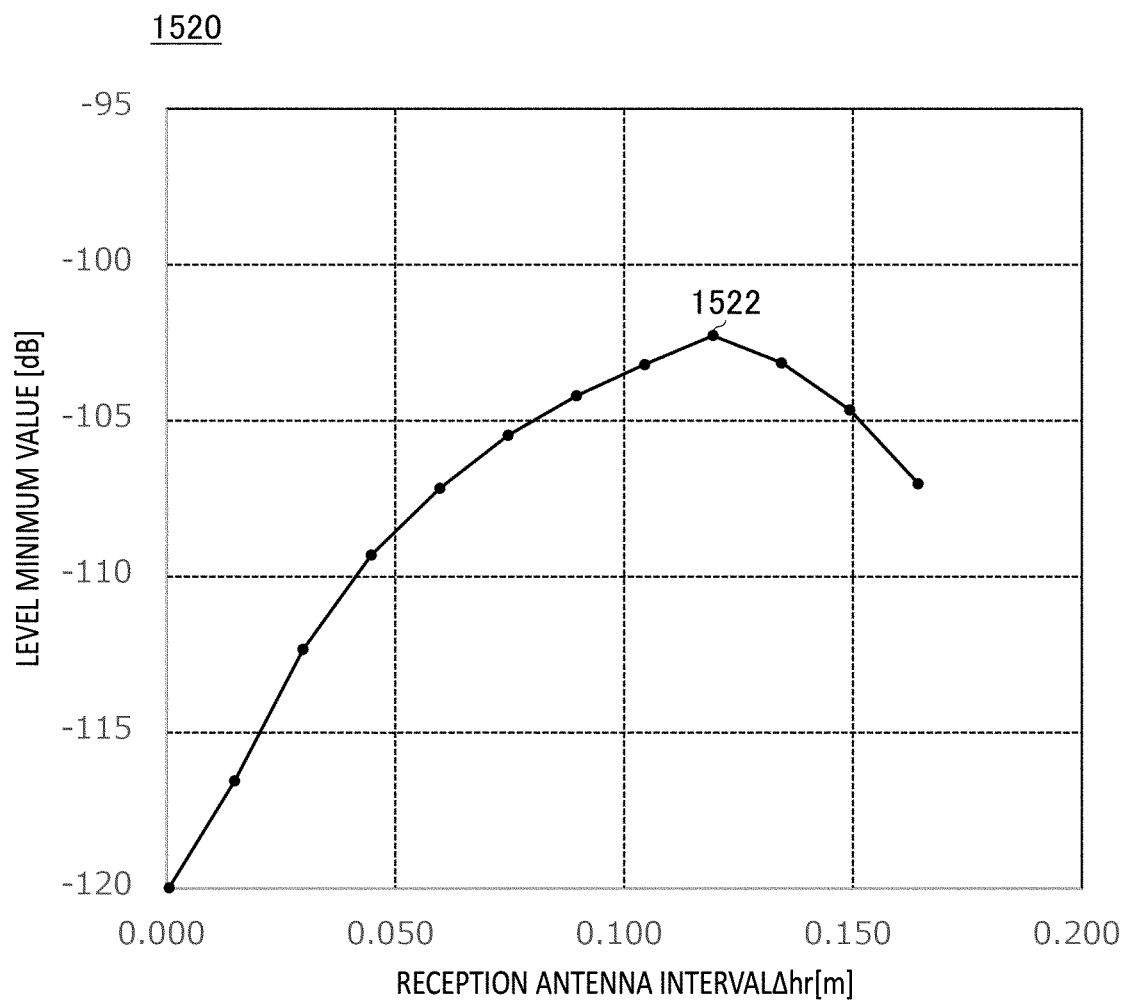
FIG. 19 schematically illustrates an example of graph data 1520 indicating a level minimum value when a reception antenna height varies for each interval between reception antennas.

FIG. 19 schematically illustrates an example of graph data 1520 indicating a level minimum value when the reception antenna height varies for each interval between reception antennas. The graph data 1520 can be generated based on the graph data 1500.

For example, with reference to the graph data 1500, a minimum value of a level minimum value when the reception antenna height hra varies is specified for each reception antenna interval Δhr. For example, in a case of the level minimum value 1501 in FIG. 4, approximately −116.5 dB is specified. Since the level minimum value 1501 indicates a case where the reception antenna interval Δhr is 0.015 m, the level minimum value=approximately −116.5 dB is plotted for the reception antenna interval Δhr=0.015 in the graph data 1520. The graph data 1520 is generated by similarly plotting for each reception antenna interval Δhr.

A local maximum 1522 indicates a local maximum of level minimum values in the graph data 1520. By specifying the local maximum 1522, it is possible to specify the reception antenna interval Δhr at which the level minimum value becomes the highest when the inter-vehicle distance and the reception antenna height hra are varied in various ways.

Figure 20:
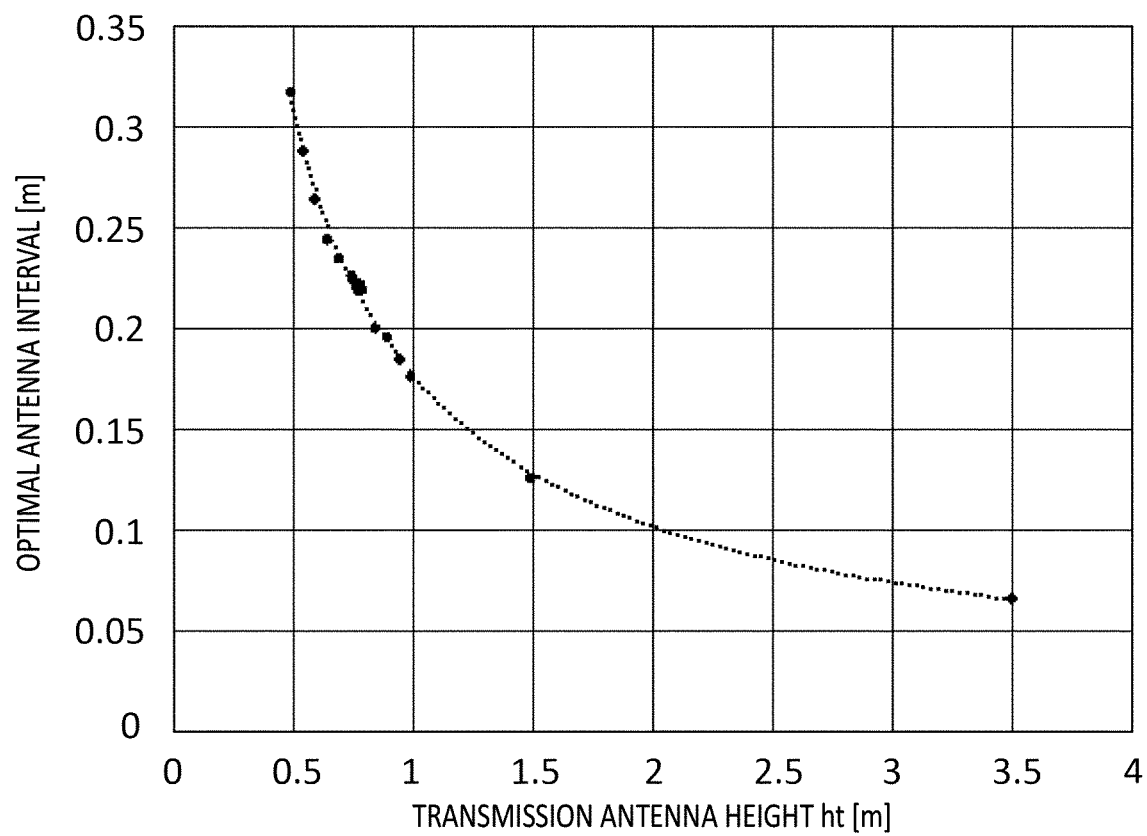
FIG. 20 schematically illustrates an example of distance interval data 1530.

FIG. 20 schematically illustrates an example of distance interval data 1530. The distance interval data 1530 indicates an optimal reception antenna interval for each transmission antenna height ht.

The distance interval data 1530 can be generated based on the graph data 1520 generated for a plurality of transmission antenna heights ht. In FIG. 18 and FIG. 19, a case has been described where the graph data 1520 is generated when the transmission antenna height ht is 1.5 m. Similarly, it is possible to generate the graph data 1520 for the plurality of transmission antenna heights ht. Then, by plotting the reception antenna interval Δhr corresponding to an approximate local maximum of respective level minimum values of the graph data 1520 for the plurality of transmission antenna heights ht, the distance interval data 1530 can be generated.

The approximate local maximum includes a local maximum and also includes a range of an error from the local maximum. It is desirable to use the reception antenna interval Δhr corresponding to the local maximum, but there is also a case where the reception antenna interval Δhr corresponding to a value slightly deviated from the local maximum due to a manufacturing error or the like is used. An interval between the antenna 1412 and the antenna 1414 according to the present embodiment allows such an error.

In FIG. 17 to FIG. 20, a case has been described where the distance interval data 1530 is generated based on the simulation or the actual measurement, but is not limited to this.

The distance interval data 1530 can also be theoretically generated by using an expression. Another example of the approach for generating the distance interval data will be described by using FIG. 21 to FIG. 23.

Figure 21:
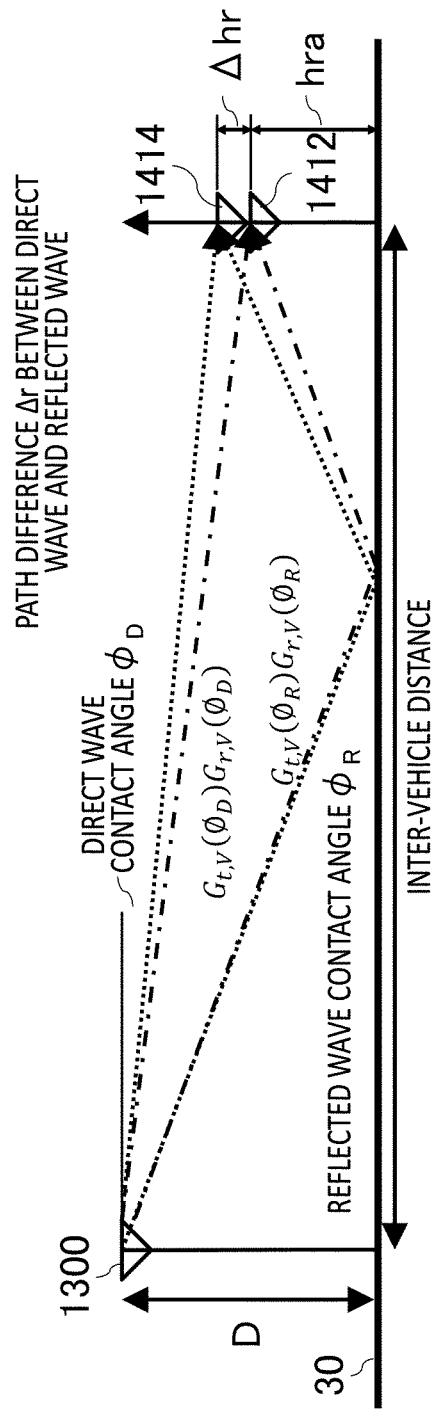
FIG. 21 is an explanatory diagram for describing the antenna 1300 and the antenna unit 1400.

FIG. 21 is an explanatory diagram for describing a radio wave which is transmitted by the antenna 1300 and received by an antenna unit 1400 of a communication partner. Where D denotes a distance between the ground 30 and the antenna 1300. A direct wave contact angle $\phi_D$ indicates a contact angle of a direct wave from the antenna 1300 to the antenna 1412 and the antenna 1414. A reflected wave contact angle $\phi_R$ indicates a contact angle of a reflected wave from the antenna 1300 to the antenna 1412 and the antenna 1414. Where $\Delta r$ denotes a path difference between the direct wave and the reflected wave from the antenna 1300 to the antenna 1412 and the antenna 1414.

$G_{t,v}(\emptyset_D)G_{r,v}(\emptyset_D)$ represents a direct wave directional gain.

$G_{t,v}(\emptyset_R)G_{r,v}(\emptyset_R)$ represents a reflected wave directional gain.

FIG. 22 illustrates expressions representing reception power $P_{r1}$ at the antenna 1412 and reception power $P_{r2}$ at the antenna 1414. Where $r_1$ denotes a path length of the direct wave from the antenna 1300 to the antenna 1412, $r_1'$ denotes a path length of the reflected wave from the antenna 1300 to the antenna 1412, and $\Delta r_1$ denotes a path difference between these. Where $r_2$ denotes a path length of the direct wave from the antenna 1300 to the antenna 1414, $\Delta r_2'$ denotes a path length of the reflected wave from the antenna 1300 to the antenna 1414, and $\Delta r_2$ denotes a path difference between these.

When the inter-vehicle distance is sufficiently long, $r_1$ and $r_2$ also increase and the reception power can be therefore approximated as in the following expression 3, and can also be approximated to be similar reception power between the antenna 1412 and the antenna 1414.

$$P_d = \text{DIRECT WAVE COMPONENT} \approx \text{REFLECTED WAVE COMPONENT} \quad \text{[Expression 3]}$$

Furthermore, a reflection coefficient can also be approximated as in the following expression 4.

$$\Gamma_e(\emptyset_{R1}) \approx \Gamma_e(\emptyset_{R2}) = \Gamma_{re} \quad \text{[Expression 4]}$$

From the expressions illustrated in FIG. 22, it can be mentioned that the diversity effect becomes the maximum when a correlation coefficient of a phase difference is −1 (in a relationship in which the phase difference is inverted).

Figure 23:
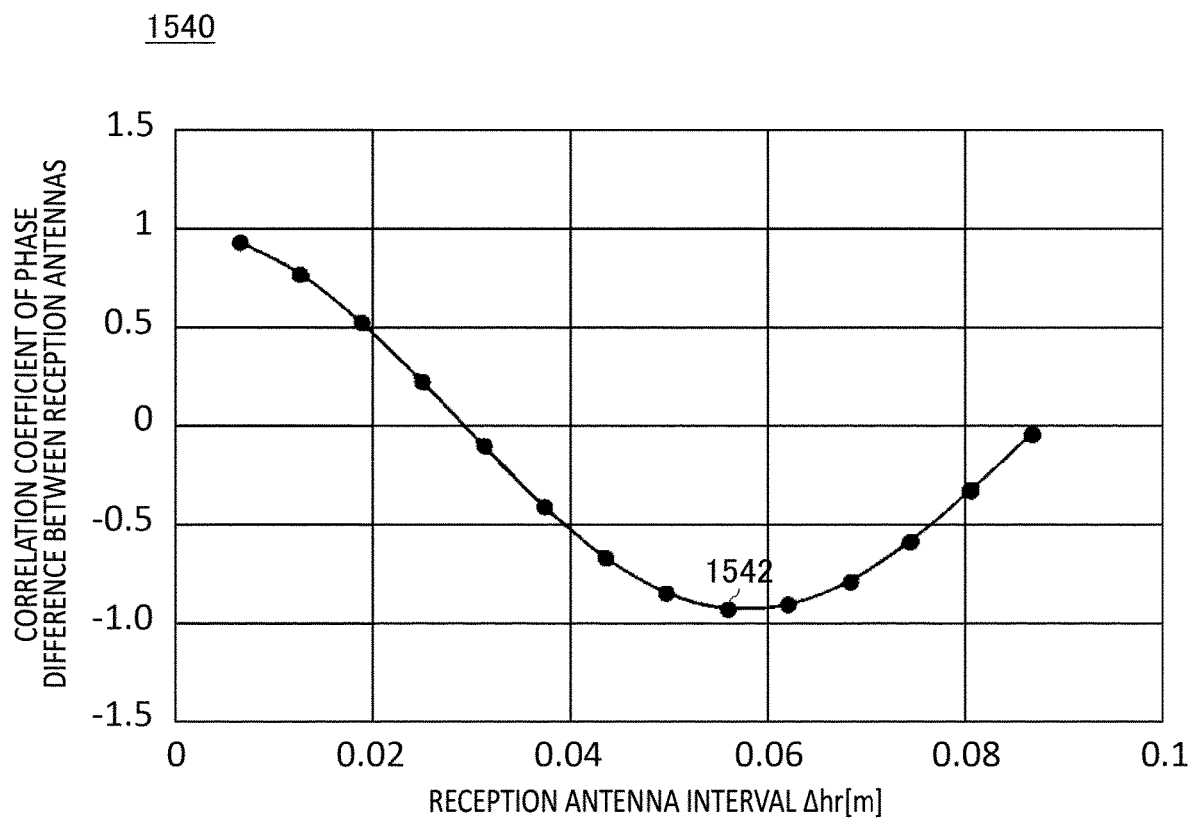
FIG. 23 schematically illustrates an example of graph data 1540 indicating a relationship between a reception antenna interval and a correlation coefficient of a phase difference.

FIG. 23 schematically illustrates an example of graph data 1540 indicating a relationship between a reception antenna interval and a correlation coefficient of a phase difference. FIG. 23 exemplifies a case where the transmission antenna height ht is 3.5 m. The graph data 1540 can be generated by using the expressions in FIG. 22.

A local minimum 1542 indicates a local minimum of a correlation coefficient in the graph data 1540. By specifying the local minimum 1542, it is possible to specify a reception antenna interval $\Delta hr$ at which the diversity effect becomes the maximum.

In FIG. 23, a case has been described where the graph data 1540 is generated when the transmission antenna height ht is 3.5 m. Similarly, it is possible to generate the graph data 1540 for a plurality of transmission antenna heights ht. Then, by plotting the reception antenna interval $\Delta hr$ corresponding to a local minimum of the respective correlation coefficients of the graph data 1540 for the plurality of transmission antenna heights ht, the distance interval data 1530 can be generated.

An approximate local minimum includes a local minimum and also includes a range of an error from the local minimum. It is desirable to use the reception antenna interval $\Delta hr$ corresponding to the local minimum, but there is also a case where the reception antenna interval $\Delta hr$ corresponding to a value slightly deviated from the local minimum due to a manufacturing error or the like is used. The reception antenna interval $\Delta hr$ according to the present embodiment allows such an error.

Figure 24:
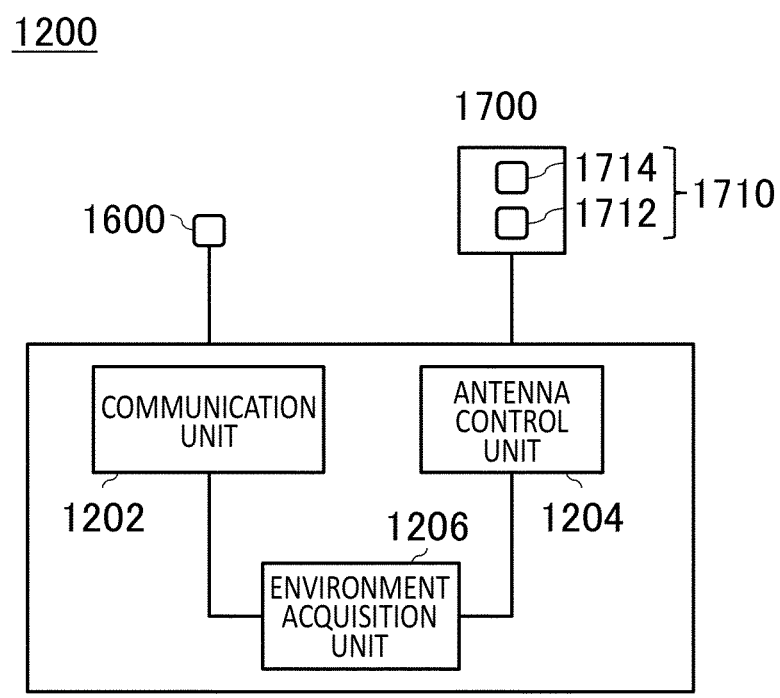
FIG. 24 schematically illustrates an example of a communication apparatus 1200.

FIG. 24 schematically illustrates an example of the communication apparatus 1200. The communication apparatus 1200 illustrated in FIG. 24 performs communication using an antenna 1600 and an antenna unit 1700. The antenna 1600 may be arranged on the front of the vehicle 1100 similarly as in the antenna 1300, for example. The antenna unit 1700 may be arranged on the back of the vehicle 1100 similarly as in the antenna unit 1400, for example. An antenna array 1710 includes an antenna 1712 and an antenna 1714.

The communication apparatus 1200 includes a communication unit 1202, an antenna control unit 1204, and an environment acquisition unit 1206. The communication unit 1202 performs communication using the antenna 1600 and the antenna unit 1700. In addition, the communication unit 1202 may communicate with a control device of the vehicle 1100 to which the communication apparatus 1200 is mounted.

The antenna control unit 1204 controls the antenna unit 1700. The antenna 1712 and the antenna 1714 may be configured such that positions thereof are changeable. The antenna 1712 and the antenna 1714 may be configured such that the positions are changeable in the horizontal direction. The antenna 1712 and the antenna 1714 may be configured such that the positions are changeable in the height direction. The antenna 1712 and the antenna 1714 may be configured such that the positions are changeable in the horizontal direction and the height direction.

The environment acquisition unit 1206 acquires an environment of the vehicle 1100 to which the communication apparatus 1200 is mounted. The environment of the vehicle 1100 may be, for example, an environment in the vicinity of the vehicle 1100. The environment of the vehicle 1100 indicates, for example, whether another vehicle, a wall, or the like exists on the side of the vehicle 1100. The environment acquisition unit 1206 acquires, for example, the environment from the control device of the vehicle 1100.

The antenna control unit 1204 may control the positions of the antenna 1712 and the antenna 1714 based on the environment acquired by the environment acquisition unit 1206. The antenna control unit 1204 changes an interval between the antenna 1712 and the antenna 1714 in the height direction or changes an interval between the antenna 1712 and the antenna 1714 in the horizontal direction according to a variation of a positional relationship between the vehicle 100 and the reflector, for example.

Figure 25:
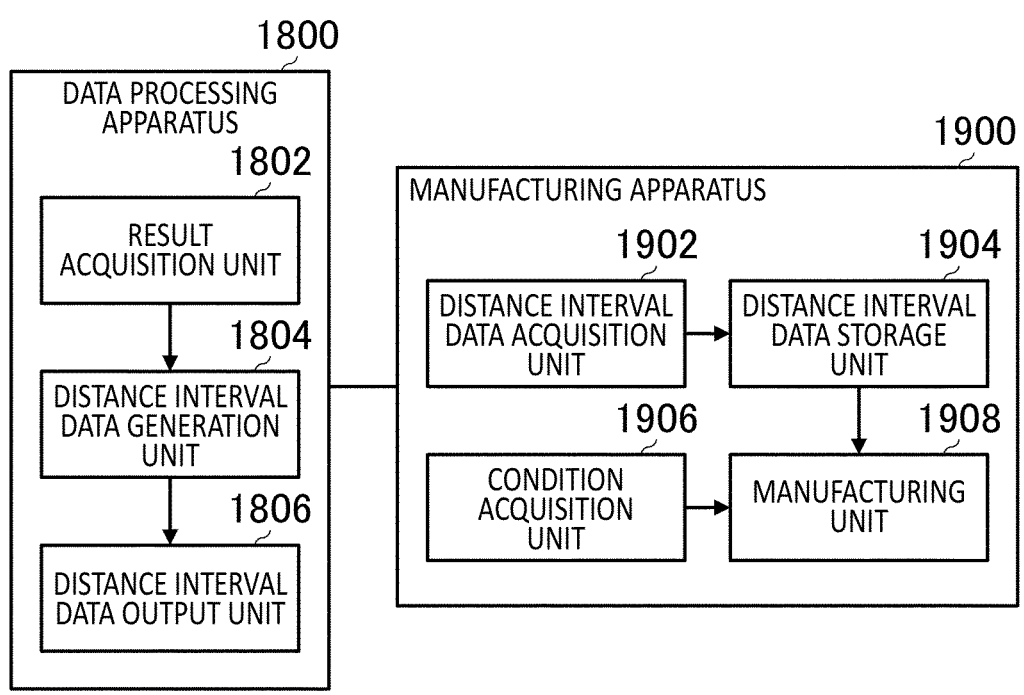
FIG. 25 schematically illustrates an example of a functional configuration of a data processing apparatus 1800 and a manufacturing apparatus 1900.

FIG. 25 schematically illustrates an example of a functional configuration of a data processing apparatus 1800 and a manufacturing apparatus 1900. The data processing apparatus 1800 generates the distance interval data 1530. The data processing apparatus 1800 includes a result acquisition unit 1802, a distance interval data generation unit 1804, and a distance interval data output unit 1806. Note that the data processing apparatus 1800 does not necessarily include all of these components.

The result acquisition unit 1802 acquires a result of a simulation with respect to the antenna 1300, the antenna 1412, and the antenna 1414. The result acquisition unit 1802 acquires, for each distance between the antenna 1300 and the reflector which reflects the radio wave emitted by the antenna 1300, for example, a result of simulating a level of a radio wave to be received from the antenna 1300 by the antenna 1412 and the antenna 1414 when a distance between the antenna 1412 and the reflector and a transmission and reception antenna distance between the antenna 1300 and the antenna 1412 are varied for each interval between the reception antenna 1412 and the reception antenna 1414. The result acquisition unit 1802 may acquire the result from a simulator. The result acquisition unit 1802 may acquire the result via a manual input.

The result acquisition unit 1802 acquires a result of an actual measurement with respect to the antenna 1300, the antenna 1412, and the antenna 1414. The result acquisition unit 1802 acquires, for each distance between the antenna 1300 and the reflector which reflects the radio wave emitted by the antenna 1300, for example, a result of actually measuring the level of the radio wave to be received from the antenna 1300 by the antenna 1412 and the antenna 1414 when the distance between the antenna 1412 and the reflector and the transmission and reception antenna distance between the antenna 1300 and the antenna 1412 are varied for each interval between the reception antenna 1412 and the reception antenna 1414. The result acquisition unit 1802 may acquire the result via a manual input.

The distance interval data generation unit 1804 generates the distance interval data 1530 by using the result acquired by the result acquisition unit 1802. The distance interval data generation unit 1804 generates, for each distance between the antenna 1300 and the reflector which reflects the radio wave emitted by the antenna 1300, for example, data such as the graph data 1500 in which a horizontal axis is a distance between the antenna 1412 and the reflector, and a vertical axis is a minimum value of a level of a radio wave to be received from the antenna 1300 by the antenna 1412 or a level of a radio wave to be received from the antenna 1300 by the antenna 1414, whichever is higher, when the transmission and reception antenna distance is varied. Note that the distance interval data generation unit 1804 does not necessarily need to generate the graph data as long as it is possible to grasp a relationship between the distance between the antenna 1412 and the reflector and the minimum value of the level of the radio wave to be received from the antenna 1300 by the antenna 1412 or the level of the radio wave to be received from the antenna 1300 by the antenna 1414, whichever is higher, when the transmission and reception antenna distance is varied. The distance interval data generation unit 1804 may generate the distance interval data 1530 indicating the reception antenna interval between the antenna 1412 and the antenna 1414 for each distance between the antenna 1300 and the reflector based on an approximate local maximum among the minimum values for each interval between the antenna 1412 and the antenna 1414. The distance interval data generation unit 1804 generates data such as the graph data 1520 which indicates a minimum value for each interval between the antenna 1412 and the antenna 1414 by specifying a level minimum value corresponding to a distance between the antenna 1412 and the reflector at which the minimum value becomes the smallest for each interval between the antenna 1412 and the antenna 1414, for example. The distance interval data generation unit 1804 may generate the distance interval data 1530 indicating the reception antenna interval between the antenna 1412 and the antenna 1414 for each distance between the antenna 1300 and the reflector by specifying a reception antenna interval corresponding to an approximate local maximum of the level minimum values from each piece of data such as the graph data 1520 generated for each distance between the antenna 1300 and the reflector. Note that the distance interval data generation unit 1804 does not necessarily need to generate graph data as long as it is possible to grasp a relationship between the interval the antenna 1412 and the antenna 1414 and the minimum values. The distance interval data generation unit 1804 may generate the distance interval data 1530 by the approach described by using FIG. 17 to FIG. 20.

The distance interval data generation unit 1804 may generate the distance interval data 1530 based on an approximate local minimum of the correlation coefficient of the phase difference between the direct wave an the reflected wave from the antenna 1300 of the antenna 1412 and the antenna 1414 for each interval between the antenna 1412 and the antenna 1414. The distance interval data generation unit 1804 may generate the distance interval data 1530 by the approach described by using FIG. 21 to FIG. 23.

The distance interval data output unit 1806 outputs the distance interval data 1530 generated by the distance interval data generation unit 1804. The distance interval data output unit 1806 may display and output the distance interval data 1530. The distance interval data output unit 1806 may transmit and output the distance interval data 1530.

The manufacturing apparatus 1900 manufactures the antenna array 1410. The manufacturing apparatus 1900 may manufacture the antenna unit 1400 including the antenna array 1410. The manufacturing apparatus 1900 includes a distance interval data acquisition unit 1902, a distance interval data storage unit 1904, a condition acquisition unit 1906, and a manufacturing unit 1908. The data processing apparatus 1800 and the manufacturing apparatus 1900 may be integrated with each other. That is, the data processing apparatus 1800 may further include a function of the manufacturing apparatus 1900. Note that the manufacturing apparatus 1900 does not necessarily include all of these components.

The distance interval data acquisition unit 1902 acquires the distance interval data 1530. The distance interval data acquisition unit 1902 may acquire the distance interval data 1530 that has been manually input. The distance interval data acquisition unit 1902 may receive the distance interval data 1530 from the distance interval data output unit 1806. The distance interval data storage unit 1904 stores the distance interval data 1530 acquired by the distance interval data acquisition unit 1902.

The condition acquisition unit 1906 acquires a manufacturing condition. The condition acquisition unit 1906 may acquire the manufacturing condition via a manual input. The condition acquisition unit 1906 acquires, for example, a transmission antenna height of the antenna 1300. The condition acquisition unit 1906 acquires, for example, a reception antenna height of the antenna 1412.

The manufacturing unit 1908 manufactures the antenna array 1410 by using the manufacturing condition acquired by the condition acquisition unit 1906 and the distance interval data 1530 stored in the distance interval data storage unit 1904. The manufacturing unit 1908 refers to the distance interval data 1530 to specify an optimal antenna interval corresponding to the transmission antenna height which falls within the manufacturing condition. The manufacturing unit 1908 decides an arrangement of the antenna 1412 and the antenna 1414 from the reception antenna height of the antenna 1412 which falls within the manufacturing condition and the specified antenna interval. The manufacturing unit 1908 manufactures the antenna array 1410 in which the antenna 1412 and the antenna 1414 are arranged according to the decided arrangement. The manufacturing unit 1908 may manufacture the antenna unit 1400 including the manufactured antenna array 1410.

Figure 26:
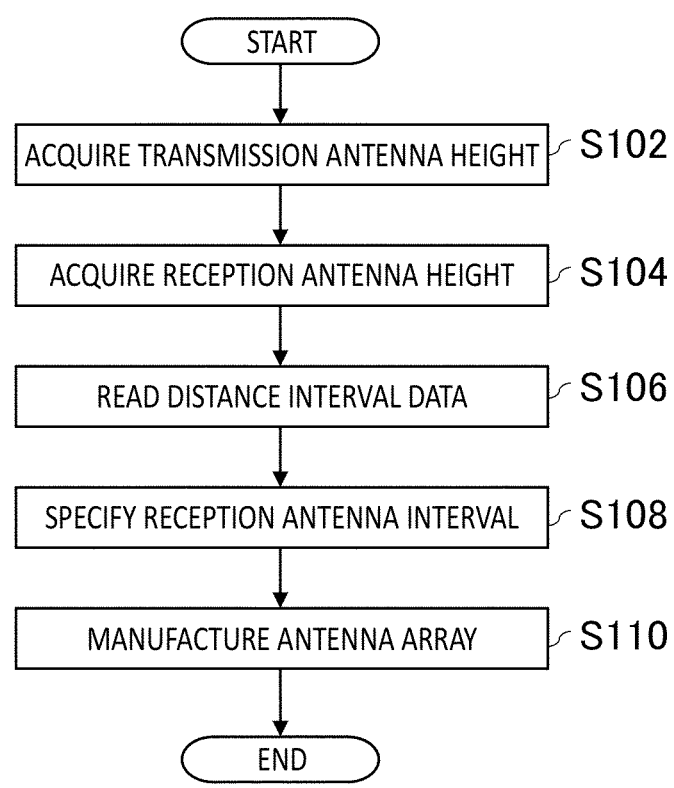
FIG. 26 schematically illustrates an example of a flow of a manufacturing process of an antenna array 1410 by the manufacturing apparatus 1900.

FIG. 26 schematically illustrates an example of a flow of a manufacturing process of the antenna array 1410 by the manufacturing apparatus 1900. In step (step may be abbreviated to be referred to as S) 102, the condition acquisition unit 1906 acquires a transmission antenna height. In S104, the condition acquisition unit 1906 acquires a reception antenna height.

In S106, the manufacturing unit 1908 reads the distance interval data 1530 from the distance interval data storage unit 1904. In S108, the manufacturing unit 1908 refers to the distance interval data 1530 read out in S106 to specify a reception antenna interval corresponding to the transmission antenna height acquired in S102. In S110, the manufacturing unit 1908 decides an arrangement of the antenna 1412 and the antenna 1414 based on the reception antenna height acquired in S104 and the reception antenna interval specified in S108. The manufacturing unit 1908 manufactures the antenna array 1410 in which the antenna 1412 and the antenna 1414 are arranged according to the decided arrangement.

According to above described embodiment, a case has been explained as an example where the vehicle 1100 includes the antenna 1300 which functions as the transmission antenna and the antenna unit 1400 which functions as the reception antenna, but is not limited to this. The vehicle 1100 may include an antenna unit which functions as the transmission antenna and an antenna which functions as the reception antenna. The antenna unit includes, for example, an antenna array including a first transmission antenna and a second transmission antenna. The first transmission antenna and the second transmission antenna may be arranged by being shifted, along a direction from a reception antenna of a communication partner which receives a radio wave emitted by the first transmission antenna and the second transmission antenna to a reflector which reflects the radio wave, by a transmission antenna interval specified based on a distance between the reception antenna and the reflector. The antenna array may include a first transmission antenna and a second transmission antenna which are arranged by being shifted by a transmission antenna interval specified by a distance between the reception antenna and the reflector and distance interval data indicating a transmission antenna interval for each distance between the reception antenna and the reflector. The distance interval data can be generated by an approach similar to that of the distance interval data 1530 described above.

Figure 27:
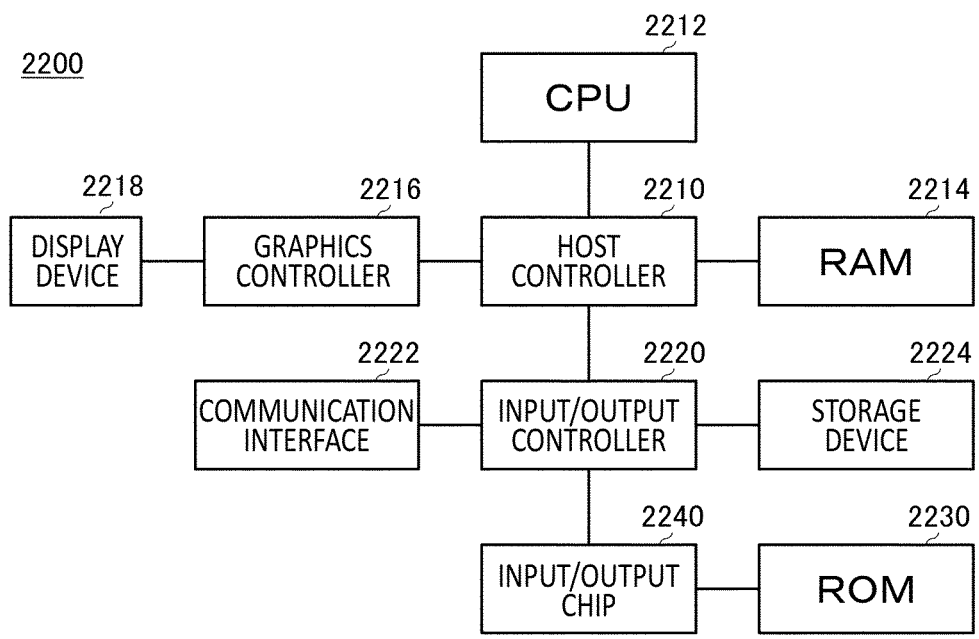
FIG. 27 schematically illustrates an example of a hardware configuration of a computer 2200 functioning as the communication apparatus 200, the communication apparatus 1200, the data processing apparatus 1800, or the manufacturing apparatus 1900.

FIG. 27 schematically illustrates an example of a hardware configuration of a computer 2200 which functions as the communication apparatus 200, the communication apparatus 1200, the data processing apparatus 1800, or the manufacturing apparatus 1900. A program installed in the computer 2200 can cause the computer 2200 to function as one or more "units" of an apparatus according to the present embodiment, or cause the computer 2200 to perform operations associated with the apparatus or perform one or more "units" thereof according to the present embodiment, and/or cause the computer 2200 to perform the process according to the present embodiment or perform the steps of the process. Such a program may be executed by a CPU 2212 to cause the computer 2200 to perform particular operations associated with some or all of the blocks in the flowcharts and block diagrams described in the specification.

The computer 2200 according to the present embodiment includes the CPU 2212, a RAM 2214, and a graphics controller 2216, which are connected to each other via a host controller 2210. The computer 2200 also includes a communication interface 2222, a storage device 2224, a DVD drive, and an input/output unit such as an IC card drive, which are connected to the host controller 2210 via an input/output controller 2220. The DVD drive may be a DVD-ROM drive, a DVD-RAM drive, and the like. The storage device 2224 may be a hard disk drive, a solid-state drive, and the like. The computer 2200 also includes a ROM 2230 and a legacy input/output unit such as a keyboard, which are connected to the input/output controller 2220 via an input/output chip 2240.

The CPU 2212 operates in accordance with programs stored in the ROM 2230 and the RAM 2214, thereby controlling each unit. The graphics controller 2216 acquires image data which is generated by the CPU 2212 in a frame buffer or the like provided in the RAM 2214 or in itself so as to cause the image data to be displayed on a display device 2218.

The communication interface 2222 communicates with other electronic devices via a network. The storage device 2224 stores a program and data used by the CPU 2212 in the computer 2200. The DVD drive is configured to read the programs or the data from the DVD-ROM or the like, and to provide the storage device 2224 with the programs or the data. The IC card drive reads programs and data from an IC card and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a USB port, a parallel port, a serial port, a keyboard port, a mouse port, or the like to the input/output controller 2220.

A program is provided by a computer readable storage medium such as the DVD-ROM or the IC card. The program is read from the computer readable storage medium, installed into the storage device 2224, RAM 2214, or ROM 2230, which are also examples of a computer readable storage medium, and executed by the CPU 2212. The information processing described in these programs is read by the computer 2200 and provides cooperation between the programs and various types of hardware resources. A device or a method may be actualized by executing operations or processing of information depending on a use of the computer 2200.

For example, when a communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffer region provided in a recording medium such as the RAM 2214, the storage device 2224, the DVD-ROM, or the IC card, and transmits the read transmission data to a network or writes reception data received from a network to a reception buffer region or the like provided on the recording medium.

In addition, the CPU 2212 may cause all or a necessary portion of a file or a database to be read into the RAM 2214, the file or the database having been stored in an external recording medium such as the storage device 2224, the DVD drive (DVD-ROM), the IC card, etc., and perform various types of processing on the data on the RAM 2214. Then, the CPU 2212 may write the processed data back in the external recording medium.

Various types of information such as various types of programs, data, tables, and databases may be stored in a recording medium and subjected to information processing. The CPU 2212 may execute, on the data read from the RAM 2214, various types of processing including various types of operations, information processing, conditional judgement, conditional branching, unconditional branching, information retrieval/replacement, or the like described throughout the present disclosure and specified by instruction sequences of the programs, to write the results back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software modules explained above may be stored in the computer readable storage medium on the computer 2200 or in the vicinity of the computer 2200. In addition, a recording medium such as a hard disk or a RAM provided in a server system connected to a dedicated communication network or the Internet can be used as the computer readable storage medium, thereby providing the program to the computer 2200 via the network.

Blocks in flowcharts and block diagrams in the present embodiments may represent steps of processes in which operations are performed or "units" of devices responsible for performing operations. A particular step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing apparatus locally or via a local area network (LAN), a wide area network (WAN) such as the Internet or the like in order that the general purpose computer, the special purpose computer, or the processor or the programmable circuitry of the other programmable data processing apparatus performs the computer readable instruction to provide means for performing operations specified by the flowchart or the block diagram. Examples of the processor include a computer processor, a processing unit, a microprocessor, a digital signal processor, a controller, a microcontroller, and the like.

In the above described embodiment, the vehicle 100 is illustrated as an example of the movable object, but the configuration is not limited to this. Other examples of the movable object include a railroad vehicle, an unmanned aerial vehicle, and the like. In addition, in the above described embodiment, the description has been provided while a case using a single antenna on the transmission side and a plurality of antennas on the reception side is mainly illustrated as an example, but a single antenna on the reception side and a plurality of antennas on the transmission side may be used.

In the above described embodiment, the vehicle 600 is illustrated as an example of the movable object, but the configuration is not limited to this. Other examples of the movable object include a railroad vehicle, an unmanned aerial vehicle, and the like.

While the present invention has been described with the embodiments, the technical scope of the present invention is not limited to the above described embodiments. It is apparent to persons skilled in the art that various alterations or improvements can be added to the above described embodiments. It is also apparent from the scope of the claims that the embodiments added with such alterations or improvements can be included in the technical scope of the present invention.

The operations, procedures, steps, and stages of each process performed by an apparatus, system, program, and method illustrated in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: system; 30: ground; 100: vehicle; 200: communication apparatus; 202: communication unit; 204:

antenna control unit; 206: distance acquisition unit; 300: antenna; 400: antenna unit; 410: antenna array; 412: antenna; 414: antenna; 416: antenna; 512, 514, 516, 518: level fluctuation; 522, 524, 526, 528: level fluctuation; 600: antenna; 700: antenna unit; 710: antenna array; 712: antenna; 1100: vehicle; 1200: communication apparatus; 1202: communication unit; 1204: antenna control unit; 1206: environment acquisition unit; 1300: antenna; 1400: antenna unit; 1410: antenna array; 1412: antenna; 1414: antenna; 1500: graph data; 1501, 1502, 1503, 1504, 1505, 1506, 1507, 1508, 1509, 1510, 1511: level minimum value; 1520: graph data; 1522: local maximum; 1530: distance interval data; 1540: graph data; 1542: local minimum; 1600: antenna; 1700: antenna unit; 1710: antenna array; 1712: antenna; 1800: data processing apparatus; 1802: result acquisition unit; 1804: distance interval data generation unit; 1806: distance interval data output unit; 1900: manufacturing apparatus; 1902: distance interval data acquisition unit; 1904: distance interval data storage unit; 1906: condition acquisition unit; 1908: manufacturing unit; 2200: computer; 2210: host controller; 2212: CPU; 2214: RAM; 2216: graphics controller; 2218: display device; 2220: input/output controller; 2222: communication interface; 2224: storage device; 2230: ROM; 2240: input/output chip.

What is claimed is:

1. An antenna apparatus mounted to a movable object, the antenna apparatus comprising:
    an antenna array including a first plurality of antennas arranged by being shifted in a lateral direction by a distance of an odd integer multiple of a half period of a period of a level fluctuation depending on an antenna lateral position at a first distance that is predetermined as a distance between the antenna apparatus and an antenna apparatus of a communication partner;
    wherein the first plurality of antennas are arranged by being shifted in a height direction by a distance of an odd integer multiple of a half period of a period of a level fluctuation depending on an antenna height at the first distance.

2. The antenna apparatus according to claim 1, wherein the first distance is a distance that is predetermined as a distance between the movable object to which the antenna apparatus is mounted and a movable object to which the antenna apparatus of the communication partner is mounted.

3. The antenna apparatus according to claim 2, wherein the first distance is a distance that is predetermined as a maximum distance between the movable object to which the antenna apparatus is mounted and the movable object to which the antenna apparatus of the communication partner is mounted.

4. The antenna apparatus according to claim 2, wherein
    the movable object is a vehicle, and
    the first distance is a distance that is predetermined as an inter-vehicle distance between a preceding vehicle and a following vehicle.

5. The antenna apparatus according to claim 1, wherein the antenna array further includes a second plurality of antennas arranged by being shifted in a lateral direction by a distance of an odd integer multiple of a half period of a period of a level fluctuation depending on an antenna lateral position at a second distance that is different from the first distance.

6. The antenna apparatus according to claim 5, wherein
    the first plurality of antennas are arranged by being shifted in a height direction by a distance of an odd integer multiple of a half period of a period of a level fluctuation depending on an antenna height at the first distance, and
    the second plurality of antennas are arranged by being shifted in a height direction by a distance of an odd integer multiple of a half period of a period of a level fluctuation depending on an antenna height at the second distance.

7. The antenna apparatus according to claim 1, wherein the antenna array further includes an antenna arranged by being shifted with respect to at least any of the first plurality of antennas in a lateral direction by a distance of an odd integer multiple of a half period of a period of a level fluctuation depending on an antenna lateral position at a second distance that is different from the first distance.

8. A system comprising:
    the antenna apparatus according to claim 1; and
    the movable object.

9. A communication apparatus mounted to a movable object, the communication apparatus comprising:
    an antenna array including a plurality of antennas;
    a distance acquisition unit which acquires a distance between a movable object to which the communication apparatus is mounted and a movable object to which a communication apparatus of a communication partner is mounted; and
    an antenna control unit which controls positions of the plurality of antennas to be shifted in a lateral direction by a distance of an odd integer multiple of a half period of a period of a level fluctuation depending on an antenna lateral position at the distance acquired by the distance acquisition unit, and controls positions of the plurality of antennas to be shifted in a height direction by a distance of an odd integer multiple of a half period of a period of a level fluctuation depending on an antenna height at the distance acquired by the distance acquisition unit.

10. A non-transitory computer readable storage medium having stored thereon a program that causes a computer to function as a communication apparatus mounted to a movable object, the communication apparatus comprising:
    an antenna array including a plurality of antennas;
    a distance acquisition unit which acquires a distance between a movable object to which the communication apparatus is mounted and a movable object to which a communication apparatus of a communication partner is mounted; and
    an antenna control unit which controls positions of the plurality of antennas to be shifted in a lateral direction by a distance of an odd integer multiple of a half period of a period of a level fluctuation depending on an antenna lateral position at the distance acquired by the distance acquisition unit, and controls positions of the plurality of antennas to be shifted in a height direction by a distance of an odd integer multiple of a half period of a period of a level fluctuation depending on an antenna height at the distance acquired by the distance acquisition unit.

* * * * *